US011025392B2

(12) United States Patent
Ge et al.

(10) Patent No.: US 11,025,392 B2
(45) Date of Patent: Jun. 1, 2021

(54) REFERENCE SIGNAL SENDING/RECEIVING METHOD, TERMINAL DEVICE, AND NETWORK DEVICE

(71) Applicant: Huawei Technologies Co., Ltd., Shenzhen (CN)

(72) Inventors: Shibin Ge, Shanghai (CN); Yong Liu, Shanghai (CN); Xiaoyan Bi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 8 days.

(21) Appl. No.: 16/457,613

(22) Filed: Jun. 28, 2019

(65) Prior Publication Data

US 2019/0327059 A1 Oct. 24, 2019

Related U.S. Application Data

(63) Continuation of application No. PCT/CN2017/111736, filed on Nov. 17, 2017.

(30) Foreign Application Priority Data

Dec. 29, 2016 (CN) .......................... 201611248806.8

(51) Int. Cl.
*H04L 5/00* (2006.01)
*H04B 17/336* (2015.01)
*H04W 72/04* (2009.01)

(52) U.S. Cl.
CPC ......... *H04L 5/0051* (2013.01); *H04B 17/336* (2015.01); *H04W 72/0446* (2013.01); *H04W 72/0473* (2013.01)

(58) Field of Classification Search
CPC ....... H04L 5/0005; H04L 5/0051; H04L 5/00; H04L 5/0048; H04L 5/006; H04B 17/336;
(Continued)

(56) References Cited

U.S. PATENT DOCUMENTS 9,144,040 B2 * 9/2015 Xiao .................... H04W 52/346
9,480,026 B2 * 10/2016 Kwak ............... H04W 72/0473
(Continued)

FOREIGN PATENT DOCUMENTS

CN 102131225 A 7/2011
CN 104853424 A 8/2015
(Continued)

OTHER PUBLICATIONS

Arikan, "Channel Polarization: A Method for Constructing Capacity-Achieving Codes for Symmetric Binary-Input Memoryless Channels," IEEE Transactions on Information Theory, vol. 55, No. 7, pp. 3051-3073, Institute of Electrical and Electronics Engineers, New York, New York (Jul. 2009).
(Continued)

*Primary Examiner* — Wutchung Chu
(74) *Attorney, Agent, or Firm* — Leydig, Voit & Mayer, Ltd.

(57) ABSTRACT

A reference signal sending/receiving method, a terminal device, and a network device are provided. The terminal device determines transmit power of a reference signal of the terminal device, where the transmit power is related to a quantity of unavailable time-frequency resources in a transmission unit in which the reference signal is located; and transmits the reference signal based on the transmit power. After receiving the reference signal from the terminal device, the network device parses the reference signal based on the transmit power. The terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and improving
(Continued)

communication performance of the terminal device with a low signal-to-noise ratio.

15 Claims, 14 Drawing Sheets

(58) Field of Classification Search
CPC ...... H04B 7/0452; H04B 7/06; H04B 7/0632; H04B 7/26; H04W 52/325; H04W 72/0446; H04W 72/0473
See application file for complete search history.

(56) References Cited

U.S. PATENT DOCUMENTS

| | | | |
|---|---|---|---|
| 9,572,063 B2* | 2/2017 | Etemad | H04L 65/4092 |
| 10,368,316 B2* | 7/2019 | Cheng | H04W 72/12 |
| 10,736,055 B2* | 8/2020 | Rahman | H04W 52/281 |
| 2010/0034151 A1* | 2/2010 | Alexiou | H04W 72/085 370/329 |
| 2010/0227637 A1* | 9/2010 | Kwon | H04L 5/0053 455/522 |
| 2011/0281612 A1* | 11/2011 | Ishii | H04W 52/32 455/522 |
| 2011/0310781 A1* | 12/2011 | Kim | H04W 52/146 370/311 |
| 2011/0317639 A1* | 12/2011 | Lee | H04W 72/1268 370/329 |
| 2012/0058791 A1* | 3/2012 | Bhattad | H04L 5/0016 455/509 |
| 2012/0238311 A1* | 9/2012 | Takahashi | H04W 52/243 455/522 |
| 2012/0282889 A1* | 11/2012 | Tanaka | H04W 52/225 455/405 |
| 2013/0058315 A1* | 3/2013 | Feuersanger | H04W 52/346 370/336 |
| 2013/0295983 A1* | 11/2013 | Kim | H04W 52/383 455/522 |
| 2014/0307669 A1* | 10/2014 | Yang | H04W 52/281 370/329 |
| 2014/0369220 A1* | 12/2014 | Fan | H04B 7/0452 370/252 |
| 2015/0011229 A1* | 1/2015 | Morita | H04W 52/146 455/448 |
| 2015/0124673 A1* | 5/2015 | Ouchi | H04W 52/362 370/311 |
| 2015/0215873 A1* | 7/2015 | Jeong | H04W 52/146 455/522 |
| 2015/0358927 A1* | 12/2015 | Gao | H04L 5/001 370/329 |
| 2016/0142976 A1* | 5/2016 | Li | H04W 76/28 370/311 |
| 2016/0174172 A1* | 6/2016 | Rahman | H04W 52/362 455/522 |
| 2016/0183203 A1* | 6/2016 | Larsson | H04W 52/386 370/329 |
| 2016/0219509 A1* | 7/2016 | Fujishiro | H04W 52/34 |
| 2016/0219529 A1* | 7/2016 | Benjebbour | H04L 5/0091 |
| 2016/0295574 A1* | 10/2016 | Papasakellariou | H04W 52/34 |
| 2016/0330005 A1* | 11/2016 | Bhattad | H04L 5/0035 |
| 2018/0049137 A1* | 2/2018 | Li | H04W 52/242 |
| 2018/0070316 A1* | 3/2018 | Sun | H04W 52/146 |
| 2018/0124707 A1* | 5/2018 | Lee | H04W 52/18 |
| 2018/0139702 A1* | 5/2018 | Ramkumar | H04W 52/16 |
| 2018/0213484 A1* | 7/2018 | Oh | H04W 52/42 |
| 2019/0059059 A1* | 2/2019 | Zhang | H04W 52/383 |
| 2019/0342061 A1* | 11/2019 | Kim | H04W 72/0473 |
| 2019/0356400 A1* | 11/2019 | Muraoka | H04W 8/005 |

FOREIGN PATENT DOCUMENTS

| | | |
|---|---|---|
| EP | 2418894 A1 | 2/2012 |
| EP | 2747494 A1 | 6/2014 |
| WO | 2011100863 A1 | 8/2011 |
| WO | 2011106457 A2 | 9/2011 |

OTHER PUBLICATIONS

Blasco-Serrano et al., "Polar Codes for Cooperative Relaying," IEEE Transactions on Communications, vol. 60, No. 11, pp. 3263-3273, Institute of Electrical and Electronics Engineers, New York, New York (Nov. 2012).

* cited by examiner

| Port indication of a reference signal | Power coefficient |
|---|---|
| A1, A2, ... | $\sqrt{2}$ |
| B1, B2, ... | $\sqrt{3}$ |
| C1, C2, ... | $\sqrt{3/2}$ |

| Port indication of a reference signal | Power coefficient |
|---|---|
| A1, A2, ... | $\sqrt{2}$ |
| B1, B2, ... | $\sqrt{3}$ |

REFERENCE SIGNAL SENDING/RECEIVING METHOD, TERMINAL DEVICE, AND NETWORK DEVICE

CROSS-REFERENCE TO RELATED APPLICATIONS

This application is a continuation of International Application No. PCT/CN2017/111736, filed on Nov. 17, 2017, which claims priority to Chinese Patent Application No. 201611248806.8, filed on Dec. 29, 2016. The disclosures of the aforementioned applications are hereby incorporated by reference in their entireties.

TECHNICAL FIELD

Embodiments of the present invention relate to the field of communications technologies, and in particular, to a reference signal sending/receiving method, a terminal device, and a network device.

BACKGROUND

In a Long Term Evolution (LTE) system, FIG. 1 is a schematic diagram of a time-domain mapping structure of an uplink demodulation reference signal (DMRS) used for physical uplink shared channel (PUSCH) demodulation in LTE. The uplink DMRS used for the PUSCH demodulation occupies a fourth (Symbol 3) and an eleventh (Symbol 10) orthogonal frequency division multiplexing (OFDM) symbols in time domain, and the uplink DMRS has a same frequency domain resource as a PUSCH.

For a multi-user multiple-input multiple-output (MU-MIMO) antenna transmission technology, in uplink MU-MIMO, DMRSs used for PUSCH demodulation are differentiated between different terminal devices (such as User Equipment (UE)) through code division, and the code division mainly includes cyclic shift (CS) and an orthogonal cover code (OCC). In a 5th generation mobile communications system (5th Generation), there are more uplink MU-MIMO application scenarios, and more flexible scheduling is required for the uplink MU-MIMO application scenarios. FIG. 2 is a schematic diagram of partial bandwidth overlapping of terminal devices in uplink MU-MIMO. Bandwidth partially overlaps between a scheduled flow (namely, a layer 1, where scheduled bandwidth of each layer is shown in the figure) of a terminal device 1 and a scheduled flow (namely, a layer 2) of a terminal device 2. In other words, some time-frequency resources are multiplexed between different terminal devices. However, because the CS is used for the uplink DMRS, multiplexing of some resources deteriorates orthogonality of the DMRS for which the CS is used. Consequently, inter-flow interference is caused.

One existing solution is: A block reference signal is used, several resource blocks (RB) are defined as one block, and a ZC short sequence is generated in blocks. One scheduled flow includes a plurality of ZC short sequences, and a resource overlapping part is an integral quantity of ZC short sequences. In this way, the orthogonality of the DMRS is not affected. However, in this solution, a peak to average power ratio (PAPR) is high, and a scheduling granularity and overlapping bandwidth of resources are limited.

Another existing solution is: Frequency division multiplexing (FDM), time division multiplexing (TDM), or frequency division multiplexing and time division multiplexing are used to replace the CS. FIG. 3a, FIG. 3b, and FIG. 3c are schematic diagrams of using FDM, TDM, or FDM and TDM to transmit uplink demodulation reference signals between terminal devices in multi-user. In the multi-user, a terminal device for which the FDM and/or the TDM is used for an uplink DMRS does not place data or a reference signal on a time-frequency resource corresponding to a DMRS of another terminal device. This does not interfere with a reference signal of the another terminal device, and does not affect MU performance. However, FIG. 3a, FIG. 3b, and FIG. 3c have blank areas. Consequently, frequency domain density of reference signals is reduced, and communication performance of a terminal device with a low signal-to-noise ratio is reduced.

Therefore, in the uplink MU-MIMO, how to send and receive an uplink reference signal to improve the communication performance of the terminal device with a low signal-to-noise ratio is a problem that needs to be resolved in a process of developing a next-generation mobile communications technology.

SUMMARY

Embodiments of the present invention provide a reference signal sending/receiving method, a terminal device, and a network device, to improve a problem of communication performance of a terminal device with a low signal-to-noise ratio when a reference signal is transmitted between the terminal device and a network device in uplink MU-MIMO.

According to a first aspect, a reference signal sending method is provided, including:

determining transmit power of a reference signal of a first terminal device, where the transmit power is related to a quantity of unavailable time-frequency resources in a transmission unit in which the reference signal is located; and transmitting the reference signal based on the transmit power.

In this implementation, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and improving communication performance of the terminal device with a low signal-to-noise ratio.

In an implementation of the first aspect, the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

In this implementation, the first terminal device specifically relates the transmit power of the reference signal of the first terminal device to a time-frequency resource occupied by a reference signal of another second terminal device that is scheduled together with the first terminal device in the transmission unit in which the reference signal is located, thereby improving the transmit power of the reference signal of the terminal device in uplink MU-MIMO, and improving communication performance of the terminal device with a low signal-to-noise ratio.

In another implementation of the first aspect, the reference signal is a demodulation reference signal or a sounding reference signal.

In still another implementation of the first aspect, reference signals of different terminal devices that are scheduled together are multiplexed in one of the following multiplexing manners: time division multiplexing; frequency division multiplexing; and time division multiplexing and frequency division multiplexing.

In this implementation, all the multiplexing manners, namely, time division multiplexing, frequency division multiplexing, and time division multiplexing and frequency division multiplexing, may be used to schedule the reference signals of the different terminal devices. This can avoid an inter-flow interference problem caused by use of cyclic shift when bandwidth of the terminal devices in uplink MU-MIMO partially overlaps.

In still another implementation of the first aspect, a larger quantity of unavailable time-frequency resources results in higher transmit power.

In this implementation, a larger quantity of unavailable time-frequency resources results in higher transmit power borrowed by the reference signal, and higher eventual transmit power of the reference signal.

In still another implementation of the first aspect, the determining transmit power of a reference signal of a first terminal device includes:

determining a power coefficient of the transmit power of the reference signal of the first terminal device, where the power coefficient is related to the quantity of unavailable time-frequency resources in the transmission unit in which the reference signal is located; and calculating the transmit power of the reference signal of the first terminal device based on the power coefficient, where the transmit power is a product of the power coefficient and preset basic power.

In this implementation, the quantity of unavailable time-frequency resources in the transmission unit in which the reference signal is located is measured by using the power coefficient, so that the quantity of unavailable time-frequency resources in the transmission unit in which the reference signal is located can be quantized, and the transmit power of the reference signal is the product of the power coefficient and the preset basic power.

In still another implementation of the first aspect, the determining a power coefficient of the transmit power of the reference signal of the first terminal device includes:

receiving the power coefficient sent by a network device, where the power coefficient is determined based on a pattern of the reference signal and a signal-to-noise ratio of the first terminal device.

In this implementation, the power coefficient is determined by the network device, and the terminal device receives the power coefficient sent by the network device.

In still another implementation of the first aspect, the determining a power coefficient of the transmit power of the reference signal of the first terminal device includes:

determining the power coefficient based on a pattern of the reference signal.

In this implementation, a time-frequency resource and an unavailable time-frequency resource of the reference signal are clearly illustrated in the pattern of the reference signal, and the power coefficient is related to the quantity of unavailable time-frequency resources in the transmission unit in which the reference signal is located. Therefore, the power coefficient can be determined based on the pattern of the reference signal.

In still another implementation of the first aspect, the determining a power coefficient of the transmit power of the reference signal of the first terminal device includes:

determining the power coefficient based on a pattern of the reference signal and a signal-to-noise ratio; and the method further includes:

sending the power coefficient to a network device.

In this implementation, the terminal device determines the power coefficient based on the pattern of the reference signal and the signal-to-noise ratio, and sends the determined power coefficient to the network device. When the signal-to-noise ratio is relatively low, the transmit power of the reference signal of the terminal device needs to be calculated based on the power coefficient, to resolve a problem that communication performance is affected when performance loss of the terminal device with a low signal-to-noise ratio is excessively high.

According to a second aspect, a terminal device is provided. The terminal device has a function of implementing behavior of the terminal device in the foregoing method. The function may be implemented by using hardware, or may be implemented by hardware executing corresponding software. The hardware or the software includes one or more modules corresponding to the foregoing function.

In a possible implementation, the terminal device includes:

a determining unit, configured to determine transmit power of a reference signal of a first terminal device, where the transmit power is related to a quantity of unavailable time-frequency resources in a transmission unit in which the reference signal is located; and a transmit unit, configured to transmit the reference signal based on the transmit power.

In another possible implementation, the terminal device includes a receiver, a transmitter, a memory, and a processor, where the memory stores a set of program code, and the processor is configured to invoke the program code stored in the memory, to perform the following operations:

determining transmit power of a reference signal of a first terminal device, where the transmit power is related to a quantity of unavailable time-frequency resources in a transmission unit in which the reference signal is located; and transmitting the reference signal based on the transmit power by using the transmitter.

Based on a same inventive concept, for a problem resolving principle and beneficial effects of the apparatus, refer to the first aspect and the possible implementations of the first aspect and beneficial effects brought by the first aspect and the possible implementations of the first aspect. Therefore, for an implementation of the apparatus, refer to the implementations of the method. Repeated parts are not described again.

According to a third aspect, a reference signal receiving method is provided, including:

receiving a reference signal from a first terminal device;

determining transmit power of the reference signal, where the transmit power of the reference signal is related to a quantity of unavailable time-frequency resources in a transmission unit in which the reference signal is located; and parsing the reference signal based on the transmit power.

In this implementation, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and a network device parses the reference signal based on the improved transmit power of the reference signal, thereby improving communication performance between the terminal device with a low signal-to-noise ratio and the network device.

In an implementation of the third aspect, the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

In this implementation, the transmit power of the reference signal of the first terminal device is specifically related to a time-frequency resource occupied by a reference signal of another second terminal device that is scheduled together with the first terminal device in the transmission unit in which the reference signal is located, thereby improving the transmit power of the reference signal of the first terminal device in uplink MU-MIMO, and improving communication performance between the first terminal device with a low signal-to-noise ratio and a network device.

In another implementation of the third aspect, the reference signal is a demodulation reference signal or a sounding reference signal.

In still another implementation of the third aspect, reference signals of different terminal devices that are scheduled together are multiplexed in one of the following multiplexing manners: time division multiplexing; frequency division multiplexing; and time division multiplexing and frequency division multiplexing.

In this implementation, all the multiplexing manners, namely, time division multiplexing, frequency division multiplexing, and time division multiplexing and frequency division multiplexing, may be used to schedule the reference signals of the different terminal devices. This can avoid an inter-flow interference problem caused by use of cyclic shift when bandwidth of the terminal devices in uplink MU-MIMO partially overlaps.

In still another implementation of the third aspect, a larger quantity of unavailable time-frequency resources results in higher transmit power.

In this implementation, a larger quantity of unavailable time-frequency resources results in higher transmit power borrowed by the reference signal, and higher eventual transmit power of the reference signal.

In still another implementation of the third aspect, the determining transmit power of the reference signal includes:
determining a power coefficient of the transmit power of the reference signal of the first terminal device, where the power coefficient is related to the quantity of unavailable time-frequency resources in the transmission unit in which the reference signal is located; and
calculating the transmit power of the reference signal of the first terminal device based on the power coefficient, where the transmit power is a product of the power coefficient and preset basic power.

In this implementation, the quantity of unavailable time-frequency resources in the transmission unit in which the reference signal is located is measured by using the power coefficient, so that the quantity of unavailable time-frequency resources in the transmission unit in which the reference signal is located can be quantized, and the transmit power of the reference signal is the product of the power coefficient and the preset basic power.

In still another implementation of the third aspect, the determining a power coefficient of the transmit power of the reference signal of the first terminal device includes:
determining the power coefficient based on a pattern of the reference signal and a signal-to-noise ratio of the first terminal device; and
the method further includes:
sending the power coefficient to the first terminal device.

In this implementation, the power coefficient is determined by a network device, and the determined power coefficient is sent to the terminal device.

In still another implementation of the third aspect, the determining a power coefficient of the transmit power of the reference signal of the first terminal device includes:
determining the power coefficient based on a pattern of the reference signal.

In this implementation, a time-frequency resource and an unavailable time-frequency resource of the reference signal are clearly illustrated in the pattern of the reference signal, and the power coefficient is related to the quantity of unavailable time-frequency resources in the transmission unit in which the reference signal is located. Therefore, the power coefficient can be determined based on the pattern of the reference signal.

In still another implementation of the third aspect, the determining a power coefficient of the transmit power of the reference signal of the first terminal device includes:
receiving the power coefficient sent by the first terminal device, where the power coefficient is determined based on a pattern of the reference signal and a signal-to-noise ratio of the first terminal device.

In this implementation, the terminal device determines the power coefficient based on the pattern of the reference signal and the signal-to-noise ratio; and a network device receives the determined power coefficient sent by the terminal device. When the signal-to-noise ratio is relatively low, the transmit power of the reference signal of the terminal device needs to be calculated based on the power coefficient, to resolve a problem that communication performance is affected when performance loss of the terminal device with a low signal-to-noise ratio is excessively high.

According to a fourth aspect, a network device is provided. The network device has a function of implementing behavior of the network device in the foregoing method. The function may be implemented by using hardware, or may be implemented by hardware executing corresponding software. The hardware or the software includes one or more modules corresponding to the foregoing function.

In a possible implementation, the network device includes:
a receiving unit, configured to receive a reference signal from a first terminal device;
a determining unit, configured to determine transmit power of the reference signal, where the transmit power of the reference signal is related to a quantity of unavailable time-frequency resources in a transmission unit in which the reference signal is located; and a processing unit, configured to parse the reference signal based on the transmit power.

In another possible implementation, the network device includes a receiver, a transmitter, a memory, and a processor, where the memory stores a set of program code, and the processor is configured to invoke the program code stored in the memory, to perform the following operations:
receiving a reference signal from a first terminal device by using the receiver;
determining transmit power of the reference signal, where the transmit power of the reference signal is related to a quantity of unavailable time-frequency resources in a transmission unit in which the reference signal is located; and
parsing the reference signal based on the transmit power.

Based on a same inventive concept, for a problem resolving principle and beneficial effects of the apparatus, refer to the third aspect and the possible implementations of the third aspect and beneficial effects brought by the third aspect and the possible implementations of the third aspect. Therefore, for an implementation of the apparatus, refer to the implementations of the method. Repeated parts are not described again.

According to a fifth aspect, a reference signal sending method is provided, including: determining transmit power of a reference signal, where power of an orthogonal frequency division multiplexing OFDM symbol on which the reference signal is located is the same as power of OFDM on which data is located, and power of a resource element occupied by the reference signal is boosted; and sending the reference signal based on the transmit power. In this aspect, the power of the OFDM symbol on which the reference signal is located is kept the same as the power of the OFDM on which the data is located, and the power of the resource element occupied by the reference signal is boosted, thereby improving the transmit power of the reference signal of a terminal device in uplink MU-MIMO, and improving communication performance of the terminal device with a low signal-to-noise ratio.

In a possible implementation, before the determining transmit power of a reference signal, the method further includes: receiving instruction information sent by a network device, where the instruction information is used to instruct to boost power of the reference signal. In this implementation, the network device instructs whether to boost the power of the reference signal.

Correspondingly, according to a sixth aspect, a communications apparatus is provided, and may implement the foregoing communication method. For example, the communications apparatus may be a chip (for example, a baseband chip or a communications chip) or a device (for example, a terminal device), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and/or data mandatory for the apparatus. Optionally, the communications apparatus may further include a communications interface, configured to support communication between the apparatus and another network element.

In another possible implementation, the communications apparatus may include a processing unit and a sending unit. The processing unit and the sending unit are respectively configured to implement a processing function and a sending function in the foregoing method. For example, the processing unit is configured to determine transmit power of a reference signal, where power of an orthogonal frequency division multiplexing OFDM symbol on which the reference signal is located is the same as power of OFDM on which data is located, and power of a resource element occupied by the reference signal is boosted; and the sending unit is configured to send the reference signal based on the transmit power.

When the communications apparatus is a chip, a receiving unit may be an input unit, for example, an input circuit or an input communications interface, and the sending unit may be an output unit, for example, an output circuit or an output communications interface. When the communications apparatus is a device, a receiving unit may be a receiver (or may be referred to as a receiver), and the sending unit may be a transmitter (or may be referred to as a transmitter).

According to a seventh aspect, a reference signal receiving method is provided, including: receiving a reference signal sent by a terminal device; and determining transmit power of the reference signal, where power of an orthogonal frequency division multiplexing OFDM symbol on which the reference signal is located is the same as power of OFDM on which data is located, and power of a resource element occupied by the reference signal is boosted; and parsing the reference signal based on the transmit power. In this aspect, the power of the OFDM symbol on which the reference signal is located is kept the same as the power of the OFDM on which the data is located, and the power of the resource element occupied by the reference signal is boosted, thereby improving the transmit power of the reference signal of the terminal device in uplink MU-MIMO, and improving communication performance of the terminal device with a low signal-to-noise ratio.

In a possible implementation, the method further includes: sending instruction information to the terminal device, where the instruction information is used to instruct to boost power of the reference signal. In this implementation, a network device instructs whether to boost the power of the reference signal.

Correspondingly, according to an eighth aspect, a communications apparatus is provided, and may implement the foregoing communication method. For example, the communications apparatus may be a chip (for example, a baseband chip or a communications chip) or a device (for example, a network device or a baseband processing board), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and data mandatory for the apparatus. Optionally, the communications apparatus may further include a communications interface, configured to support communication between the apparatus and another network element.

In another possible implementation, the communications apparatus may include a receiving unit and a processing unit. The receiving unit and the processing unit are respectively configured to implement a receiving function and a processing function in the foregoing method. For example, the receiving unit is configured to receive a reference signal sent by a terminal device; the processing unit is configured to determine transmit power of the reference signal, where power of an orthogonal frequency division multiplexing OFDM symbol on which the reference signal is located is the same as power of OFDM on which data is located, and power of a resource element occupied by the reference signal is boosted; and the processing unit is further configured to parse the reference signal based on the transmit power.

When the communications apparatus is a chip, the receiving unit may be an input unit, for example, an input circuit or an input communications interface, and a sending unit may be an output unit, for example, an output circuit or an output communications interface. When the communications apparatus is a device, the receiving unit may be a receiver (or may be referred to as a receiver), and a sending unit may be a transmitter (or may be referred to as a transmitter).

According to a ninth aspect, a reference signal sending method is provided, including: determining transmit power of a reference signal based on a power coefficient Power-boosting of the transmit power, where the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of a terminal device; and sending the reference signal based on the transmit power. In this aspect, the power coefficient of the reference signal may be determined by using a plurality of parameters, to determine the transmit power, thereby improving the transmit power of the reference signal of the terminal device in uplink MU-MIMO, and improving communication performance of the terminal device with a low signal-to-noise ratio.

Correspondingly, according to a tenth aspect, a communications apparatus is provided, and may implement the foregoing communication method. For example, the communications apparatus may be a chip (for example, a baseband chip or a communications chip) or a device (for example, a terminal device), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and/or data mandatory for the apparatus. Optionally, the communications apparatus may further include a communications interface, configured to support communication between the apparatus and another network element.

In another possible implementation, the communications apparatus may include a processing unit and a sending unit. The processing unit and the sending unit are respectively configured to implement a processing function and a sending function in the foregoing method. For example, the processing unit is configured to determine transmit power of a reference signal based on a power coefficient Powerboosting of the transmit power, where the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of a terminal device; and the sending unit is configured to send the reference signal based on the transmit power.

When the communications apparatus is a chip, a receiving unit may be an input unit, for example, an input circuit or an input communications interface, and the sending unit may be an output unit, for example, an output circuit or an output communications interface. When the communications apparatus is a device, a receiving unit may be a receiver (or may be referred to as a receiver), and the sending unit may be a transmitter (or may be referred to as a transmitter).

According to an eleventh aspect, a reference signal sending method is provided, including: receiving a reference signal sent by a terminal device; determining transmit power of the reference signal based on a power coefficient Powerboosting of the transmit power, where the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of the terminal device; and parsing the reference signal based on the transmit power. In this aspect, the power coefficient of the reference signal may be determined by using a plurality of parameters, to determine the transmit power, thereby improving the transmit power of the reference signal of the terminal device in uplink MU-MIMO, and improving communication performance of the terminal device with a low signal-to-noise ratio.

Correspondingly, according to a twelfth aspect, a communications apparatus is provided, and may implement the foregoing communication method. For example, the communications apparatus may be a chip (for example, a baseband chip or a communications chip) or a device (for example, a network device or a baseband processing board), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and data mandatory for the apparatus. Optionally, the communications apparatus may further include a communications interface, configured to support communication between the apparatus and another network element.

In another possible implementation, the communications apparatus may include a processing unit and a receiving unit. The processing unit and the receiving unit are respectively configured to implement a processing function and a receiving function in the foregoing method. For example, the receiving unit is configured to receive a reference signal sent by a terminal device; the processing unit is configured to determine transmit power of the reference signal based on a power coefficient Powerboosting of the transmit power, where the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of the terminal device; and the processing unit is further configured to parse the reference signal based on the transmit power.

When the communications apparatus is a chip, the receiving unit may be an input unit, for example, an input circuit or an input communications interface, and a sending unit may be an output unit, for example, an output circuit or an output communications interface. When the communications apparatus is a device, the receiving unit may be a receiver (or may be referred to as a receiver), and a sending unit may be a transmitter (or may be referred to as a transmitter).

With reference to the ninth aspect to the twelfth aspect, in a possible implementation, the transmit power, the power coefficient, and basic transmit power meet the following relationship: 20*lg(Power coefficient)=10*lg(Transmit power/Basic transmit power).

With reference to the ninth aspect to the twelfth aspect, in another possible implementation, the power coefficient is:

$$Powerboosting = \sqrt{\frac{N_{Mute}REs + N_{DMRS} + REs}{N_{DMRS}REs}} \text{; or}$$

$$Powerboosting = \sqrt{\frac{N_{Total}REs - N_{Data}REs}{N_{DMRS}REs}} \text{; or}$$

$$Powerboosting = \sqrt{\frac{CDM_{Cell}}{CDM_{UE}}} \text{; or}$$

$$Powerboosting = \sqrt{CDM_{Cell}},$$

Powerboosting=$\sqrt{CDM_{Cell}}$, where $N_{Mute}REs$ is the quantity of unavailable resource elements, $N_{RS}REs$ is the quantity of resource elements occupied by the reference signal, $N_{Total}REs$ is the quantity of resource elements on the OFDM symbol on which the reference signal is located, $N_{Data}REs$ is the quantity of resource elements on the OFDM symbol that are occupied by the data, $CDM_{Cell}$ is the quantity of port groups corresponding to the frequency-division multiplexed reference signal in the cell, and $CDM_{UE}$ is the quantity of port groups corresponding to the frequency-division multiplexed reference signal of the terminal device.

According to a thirteenth aspect, a reference signal sending method is provided, including: receiving a pattern of a reference signal and a port indication of the reference signal that are sent by a network device; determining transmit power of the reference signal based on the pattern of the reference signal and the port indication of the reference signal; and sending the reference signal based on the transmit power. In this aspect, the transmit power of the reference signal may be determined based on the pattern of the reference signal and the port indication of the reference signal, and the transmit power of the reference signal is boosted, thereby improving the transmit power of the reference signal of a terminal device in uplink MU-MIMO, and improving communication performance of the terminal device with a low signal-to-noise ratio.

In a possible implementation, the pattern of the reference signal includes a quantity of orthogonal frequency division multiplexing OFDM symbols occupied by the reference signal and a type of the reference signal.

In another possible implementation, the processing unit is specifically configured to: determine one correspondence from a plurality of correspondences based on the pattern of the reference signal, where each correspondence includes a correspondence between at least one port indication of a reference signal and at least one power coefficient of transmit power; determine, in the determined correspondence based on the port indication of the reference signal, a power coefficient corresponding to the received port indication of the reference signal; and determine the transmit power based on the power coefficient.

Correspondingly, according to a fourteenth aspect, a communications apparatus is provided, and may implement the foregoing communication method. For example, the communications apparatus may be a chip (for example, a baseband chip or a communications chip) or a device (for example, a terminal device), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and/or data mandatory for the apparatus. Optionally, the communications apparatus may further include a communications interface, configured to support communication between the apparatus and another network element.

In another possible implementation, the communications apparatus may include a receiving unit, a processing unit, and a sending unit. The receiving unit, the processing unit, and the sending unit are respectively configured to implement a receiving function, a processing function, and a sending function in the foregoing method. For example, the receiving unit is configured to receive a pattern of a reference signal and a port indication of the reference signal that are sent by a network device; the processing unit is configured to determine transmit power of the reference signal based on the pattern of the reference signal and the port indication of the reference signal; and the sending unit is configured to send the reference signal based on the transmit power.

When the communications apparatus is a chip, the receiving unit may be an input unit, for example, an input circuit or an input communications interface, and the sending unit may be an output unit, for example, an output circuit or an output communications interface. When the communications apparatus is a device, the receiving unit may be a receiver (or may be referred to as a receiver), and the sending unit may be a transmitter (or may be referred to as a transmitter).

According to a fifteenth aspect, a reference signal receiving method is provided, including: sending a pattern of a reference signal and a port indication of the reference signal to a terminal device; receiving the reference signal sent by the terminal device; determining transmit power of the reference signal based on the pattern of the reference signal and the port indication of the reference signal; and parsing the reference signal based on the transmit power. In this aspect, the transmit power of the reference signal may be determined based on the pattern of the reference signal and the port indication of the reference signal, and the transmit power of the reference signal is boosted, thereby improving the transmit power of the reference signal of the terminal device in uplink MU-MIMO, and improving communication performance of the terminal device with a low signal-to-noise ratio.

Correspondingly, according to a sixteenth aspect, a communications apparatus is provided, and may implement the foregoing communication method. For example, the communications apparatus may be a chip (for example, a baseband chip or a communications chip) or a device (for example, a network device or a baseband processing board), and may implement the foregoing method by software or hardware or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (an instruction) and data mandatory for the apparatus. Optionally, the communications apparatus may further include a communications interface, configured to support communication between the apparatus and another network element.

In another possible implementation, the communications apparatus may include a processing unit and a sending unit. The processing unit and the sending unit are respectively configured to implement a processing function and a sending function in the foregoing method. For example, When the communications apparatus is a chip, a receiving unit may be an input unit, for example, an input circuit or an input communications interface, and the sending unit may be an output unit, for example, an output circuit or an output communications interface. When the communications apparatus is a device, a receiving unit may be a receiver (or may be referred to as a receiver), and the sending unit may be a transmitter (or may be referred to as a transmitter).

DESCRIPTION OF EMBODIMENTS

A terminal device in the embodiments of the present invention may communicate with one or more core networks by using a radio access network (RAN). The terminal device may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device or another processing device connected to a wireless modem, an in-vehicle device, a wearable device, UE in a future 5G network, or the like.

A network device in the embodiments of the present invention that is configured to communicate with a terminal device, for example, may be a base transceiver station ("BTS" for short) in a GSM or CDMA system, may be a NodeB ("NB" for short) in a WCDMA system, or may be an evolved NodeB ("eNB" or "eNodeB" for short) in an LTE system. Alternatively, the network device may be a relay station, an access point, an in-vehicle device, or a wearable device, may be a Wireless Fidelity (Wi-Fi) station, or may be a base station in next-generation communication, such as a base station, a small base station, or a micro base station in 5G.

Figure 4:
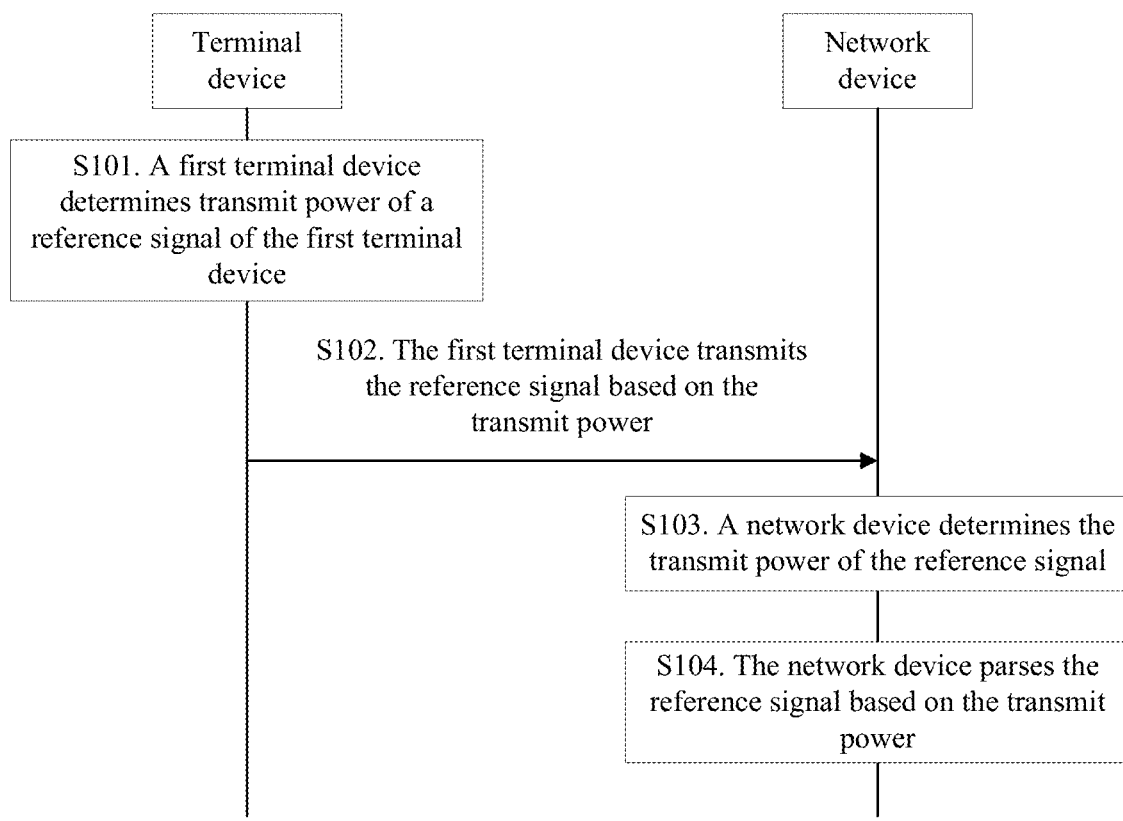
FIG. 4 is a schematic interactive diagram of a reference signal sending and receiving method according to an embodiment of the present invention.

FIG. 4 is a schematic interactive diagram of a reference signal sending and receiving method according to an embodiment of the present invention. The method includes the following steps.

S101. A first terminal device determines transmit power of a reference signal of the first terminal device.

The reference signal (RS) is a "pilot" signal, and is a known signal that is provided by a transmit end for a receive end and that is used for channel estimation or channel sounding. This embodiment of the present invention mainly relates to sending of the reference signal in uplink communication. During the uplink communication, the terminal device sends an uplink reference signal to a network device. The uplink reference signal is used for two purposes: uplink channel estimation, used for coherent demodulation and detection on a network device side; and uplink channel quality measurement. The uplink reference signal includes a demodulation reference signal and a sounding reference signal (SRS). The DMRS is associated with sending of a PUSCH and a physical uplink control channel (PUCCH), to obtain a channel estimation matrix, and assist in demodulation of the two channels. The SRS is transmitted independently, to estimate quality of an uplink channel, select the channel, and calculate a signal to interference plus noise ratio (SINR) of the uplink channel.

In MU, terminal devices transmit uplink demodulation reference signals in a multiplexing manner such as FDM, TDM, or FDM and TDM, and data or a reference signal cannot be placed on a time-frequency resource corresponding to a reference signal of another terminal device. In this case, the time-frequency resource (the time-frequency resource is also referred to as an "unavailable time-frequency resource") needs to be idle; otherwise, interference is caused to the reference signal of the another terminal device, and MU performance is affected. For the terminal device, some time-frequency resources are idle, and power allocated to the time-frequency resources is 0, but fixed power is allocated to a transmission unit in which the reference signal is located. Therefore, in this embodiment of the present invention, it is considered that the transmit power of the reference signal is associated with transmit power of an unavailable time-frequency resource in the transmission unit in which the reference signal is located, and a magnitude of transmit power that can be obtained by the reference signal is related to a quantity of unavailable time-frequency resources. In this embodiment, the terminal device determines the transmit power of the reference signal of the terminal device, and the transmit power is related to the quantity of unavailable time-frequency resources in the transmission unit in which the reference signal is located. A difference from the prior art is that the transmit power of the reference signal is not only a time-frequency resource corresponding to a time-frequency resource occupied by the reference signal, but is also related to the quantity of unavailable time-frequency resources in the transmission unit in which the reference signal is located. The transmission unit may be a resource block (RB), a resource block pair (RB Pair), or a user-defined time-frequency resource.

Specifically, the unavailable time-frequency resource is a time-frequency resource occupied by a reference signal of at least one other terminal device that is scheduled together with the first terminal device, and a time-frequency resource occupied by a data channel of the terminal device at least partially overlaps a time-frequency resource occupied by a data channel of the at least one other terminal device. In this embodiment, reference signals of different terminal devices that are scheduled together are multiplexed in one of the following multiplexing manners: time division multiplexing; frequency division multiplexing; and time division multiplexing and frequency division multiplexing.

Figure 1:
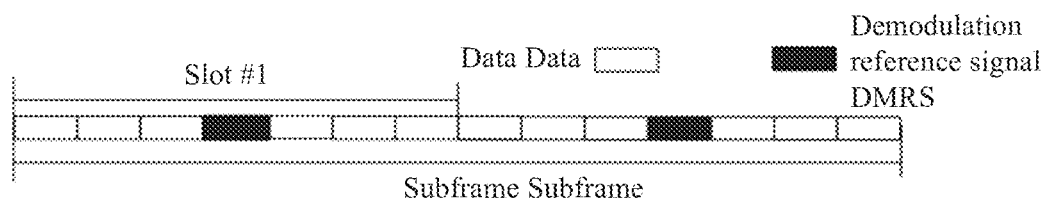
FIG. 1 is a schematic diagram of a time-domain mapping structure of an uplink demodulation reference signal used for physical uplink shared channel demodulation in LTE.
Figure 2:
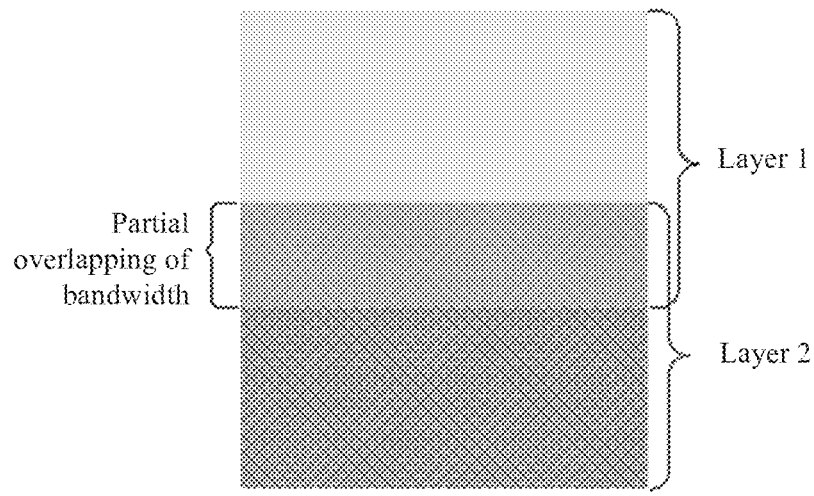
FIG. 2 is a schematic diagram of partial overlapping of bandwidth of terminal devices in an uplink multi-user multiple-input multiple-output scenario.
Figure 3A:
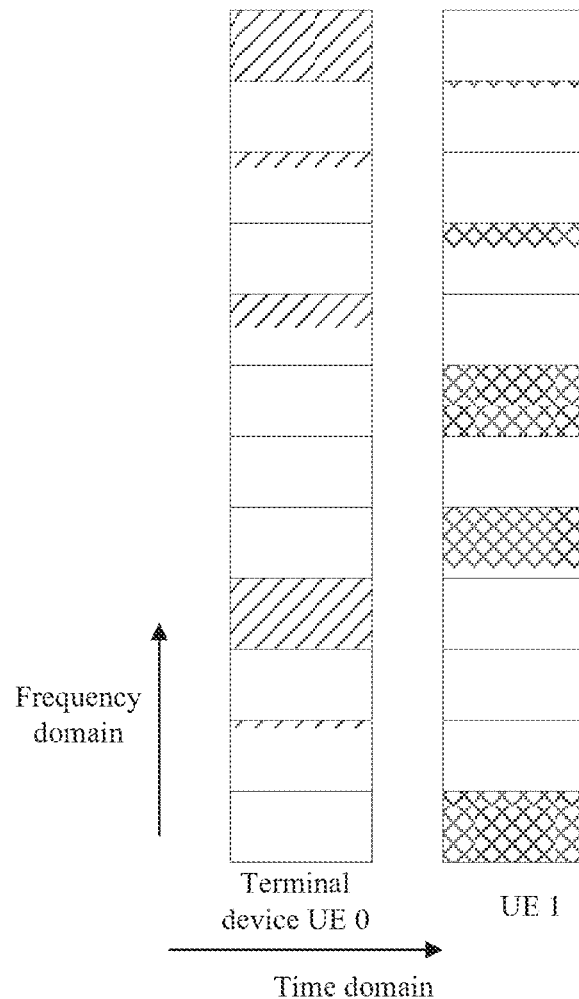
FIG. 3a, FIG. 3b, and FIG. 3c are schematic diagrams showing that terminal devices transmit uplink demodulation reference signals by using frequency division multiplexing, time division multiplexing, or frequency division multiplexing and time division multiplexing in multi-user.

FIG. 3a is a schematic diagram showing that terminal devices transmit uplink demodulation reference signals by using frequency division multiplexing in multi-user. UE 0 and UE 1 are two terminal devices that are scheduled together in MU-MIMO. A reference signal of the UE 0 occupies time-frequency resources in dash areas in the left picture, and a frequency-divided reference signal of the UE 1 occupies time-frequency resources in blank areas in the left picture, namely, time-frequency resources in dash areas in the right picture (the reference signal of the UE 0 and the reference signal of the UE 1 are the same in time domain, but occupy different subcarriers). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

Figure 3B:
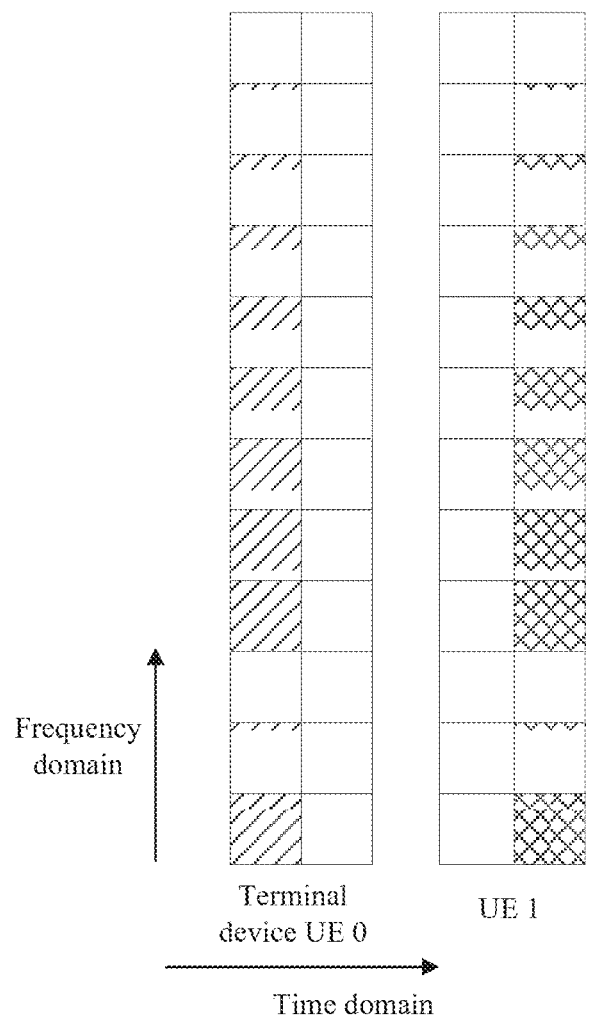

FIG. 3b is a schematic diagram showing that terminal devices transmit uplink demodulation reference signals by using time division multiplexing in multi-user. UE 0 and UE 1 are two terminal devices that are scheduled together in MU-MIMO. A reference signal of the UE 0 occupies time-frequency resources in dash areas in the left picture, and a time-divided reference signal of the UE 1 occupies time-frequency resources in blank areas in the left picture, namely, time-frequency resources in dash areas in the right picture (the reference signal of the UE 0 and the reference signal of the UE 1 are the same in frequency domain, but are different in time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

Figure 3C:
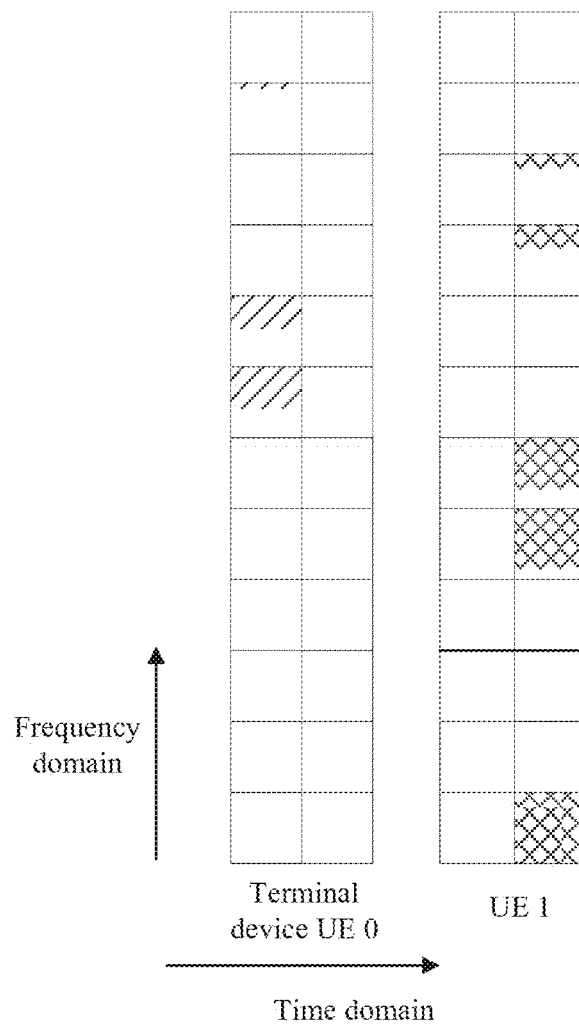

FIG. 3c is a schematic diagram showing that terminal devices transmit uplink demodulation reference signals by using frequency division multiplexing and time division multiplexing in multi-user. UE 0 and UE 1 are two terminal devices that are scheduled together in MU-MIMO. A reference signal of the UE 0 occupies time-frequency resources in dash areas in the left picture, and a time-divided and frequency-divided reference signal of the UE 1 occupies time-frequency resources in some blank areas in the left picture (time-frequency resources in remaining blank areas are occupied by another terminal device that is scheduled together with the UE 0 and the UE 1 and that is not shown in the figure). In other words, the time-frequency resources occupied by the UE 1 are time-frequency resources in dash areas in the right picture (the reference signal of the UE 0 and the reference signal of the UE 1 are different in both frequency domain and time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

The terminal device determines the transmit power of the reference signal of the terminal device. The transmit power is related to the quantity of unavailable time-frequency resources in the transmission unit in which the reference signal is located. In a specific implementation process, in the transmission unit, particular transmit power is correspondingly allocated to each time-frequency resource based on a quantity of time-frequency resources. The reference signal occupies a particular quantity of time-frequency resources, and transmit power originally allocated to the reference signal is basic transmit power of the reference signal. In this embodiment, the transmit power of the reference signal is an accumulation of the basic transmit power of the reference signal and transmit power allocated to the unavailable time-frequency resource. This is similar to a case in which transmit power allocated to the time-frequency resource occupied by the reference signal of the at least one other terminal device that is scheduled together with the first terminal device is "borrowed" (power boosting) by the reference signal of the terminal device. The time-frequency resource occupied by the reference signal of the at least one other terminal device that is scheduled together with the first terminal device is a time-frequency resource in a blank area in the transmission unit of the terminal device. As the time-frequency resource in the blank area is occupied by a reference signal of another terminal device, the time-frequency resource is unavailable for the terminal device, and the transmit power allocated to the time-frequency resource is "borrowed" by the reference signal of the terminal device. In addition, a larger quantity of unavailable time-frequency resources results in higher transmit power.

S102. The first terminal device transmits the reference signal based on the transmit power.

The terminal device transmits the reference signal based on enhanced transmit power. The transmit power is an accumulation of the basic transmit power of the reference signal and the transmit power allocated to the unavailable time-frequency resource. The network device receives the reference signal from the terminal device.

S103. A network device determines the transmit power of the reference signal.

The network device needs to determine the enhanced transmit power at which the terminal device transmits the reference signal. Specifically, the network device usually knows basic patterns of reference signals of a plurality of terminal devices in MU and basic transmit power corresponding to the basic patterns. Therefore, through comparison, the network device may determine enhanced transmit power of a reference signal of each terminal device based on an actual pattern of the reference signal.

S104. The network device parses the reference signal based on the transmit power.

The network device receives the reference signal, and parses the reference signal based on the enhanced transmit power.

Specifically, for example, y=h*(2x), where h indicates a channel sequence, x is a reference signal sequence corresponding to basic power, and 2x is a reference signal sequence obtained after transmit power has been accumulated/enhanced (namely, double transmit power of the reference signal, where double herein is merely an example). The network device obtains y, and needs to divide y by 2x rather than x, to parse out h.

According to the technical solution provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

Figure 5:
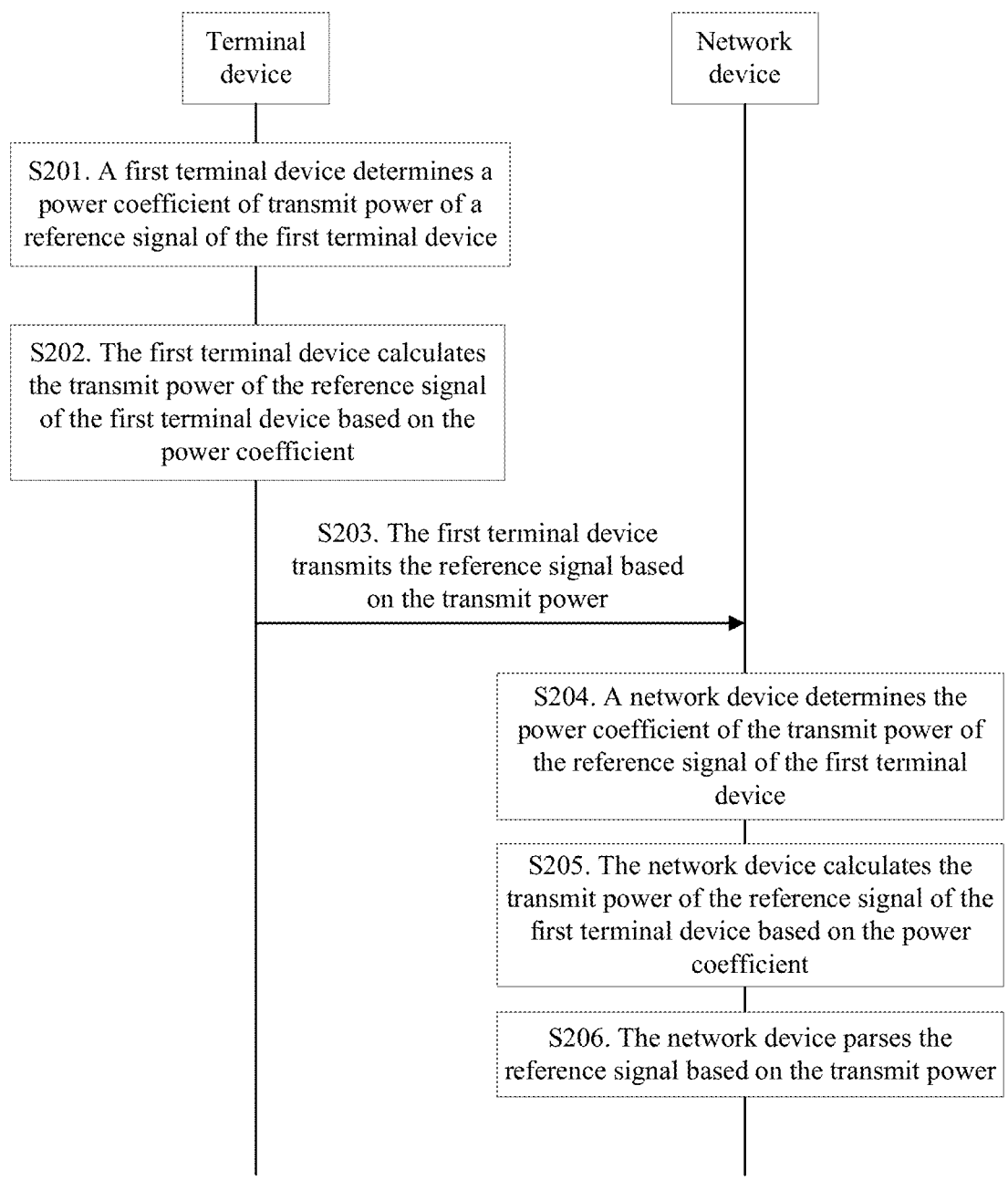
FIG. 5 is a schematic interactive diagram of another reference signal sending and receiving method according to an embodiment of the present invention.

FIG. 5 is a schematic interactive diagram of another reference signal sending and receiving method according to an embodiment of the present invention. The method includes the following steps.

S201. A first terminal device determines a power coefficient of transmit power of a reference signal of the first terminal device.

In this embodiment, the power coefficient is used to quantize transmit power "borrowed" by the reference signal of the terminal device. The power coefficient is related to a quantity of unavailable time-frequency resources in a transmission unit in which the reference signal is located. In other words, transmit power allocated to an unavailable time-frequency resource in the transmission unit in which the reference signal is located is "borrowed" by the reference signal.

Specifically, basic power corresponding to each resource block or resource element in the transmission unit has been configured. Therefore, the terminal device can determine the power coefficient based on a pattern of the reference signal. The pattern of the reference signal indicates, in a pattern of the transmission unit, which time-frequency resource is occupied by the reference signal and which time-frequency resource is unavailable. Both the time-frequency resource occupied by the reference signal and the unavailable time-frequency resource are embodied in the pattern of the transmission unit. The transmit power allocated to the unavailable time-frequency resource may be "borrowed" by the reference signal, and the power coefficient may be determined based on the pattern of the reference signal.

Specifically, the terminal device may obtain the power coefficient of the reference signal in a plurality of manners: Manner 1: A network device determines the power coefficient of the terminal device based on the pattern of the reference signal (a DMRS pattern) of the terminal device and a signal-to-noise ratio of the terminal device, and sends the power coefficient to the terminal device; and the terminal device receives the power coefficient sent by the network device. The pattern of the reference signal of the terminal device herein is an actual pattern of the reference signal of the terminal device. The actual pattern of the reference signal of the terminal device is described relative to basic patterns of reference signals of a plurality of terminal devices in MU. An actual pattern of a reference signal of each terminal device can be determined based on the basic patterns of the reference signals of the plurality of terminal devices in the MU and a quantity of scheduled flows of each terminal device. Manner 2: The terminal device determines the power coefficient based on the pattern of the reference signal. The pattern of the reference signal herein is also an actual pattern of the reference signal of the terminal device. Manner 3: The terminal device determines the power coefficient based on the pattern of the reference signal and a signal-to-noise ratio, and reports the power coefficient to the network device. The pattern of the reference signal herein is also an actual pattern of the reference signal of the terminal device. It should be noted that in the foregoing manner 1 and manner 3, when the terminal device determines the power coefficient, a signal-to-noise ratio factor may be further considered. A quantity of unavailable subcarriers of each terminal device is determined based on the basic patterns of the reference signals of the plurality of terminal devices in the MU and the quantity of scheduled flows of each terminal device. In other words, a power coefficient of the terminal device is determined. When the signal-to-noise ratio is relatively high, performance loss is quite low, and "power borrowing" may not be performed; and when the signal-to-noise ratio is relatively low, if "power borrowing" is not performed, performance loss is high, and therefore "power borrowing" needs to be performed. In the manner 2, the power coefficient depends entirely on the pattern of the reference signal, and "power borrowing" needs to be performed regardless of whether the signal-to-noise ratio is high or low; and therefore the terminal device may not report the power coefficient to the network device.

S202. The first terminal device calculates the transmit power of the reference signal of the first terminal device based on the power coefficient.

After the power coefficient of the transmit power of the reference signal is determined, the transmit power of the reference signal of the terminal device is calculated based on the power coefficient. Specifically, the transmit power is a product of the power coefficient and preset basic power, and the preset basic power has been configured.

S203. The first terminal device transmits the reference signal based on the transmit power.

The terminal device transmits the reference signal based on enhanced transmit power. The transmit power is an accumulation of basic transmit power of the reference signal and the transmit power allocated to the unavailable time-frequency resource. The network device receives the reference signal from the terminal device.

S204. A network device determines the power coefficient of the transmit power of the reference signal of the first terminal device.

S205. The network device calculates the transmit power of the reference signal of the first terminal device based on the power coefficient.

Likewise, after receiving the reference signal of the terminal device, the network device may calculate the transmit power of the reference signal of the terminal device based on the power coefficient that is of the transmit power of the reference signal of the terminal device and that is obtained in the foregoing three manners.

S206. The network device parses the reference signal based on the transmit power.

The network device receives the reference signal, and parses the reference signal based on the enhanced transmit power.

According to the technical solution provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously.

Figure 6:
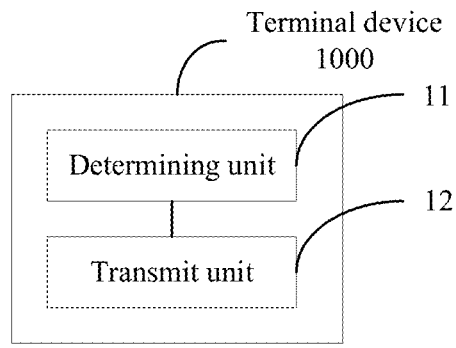
FIG. 6 is a schematic structural diagram of a terminal device according to an embodiment of the present invention.

FIG. 6 is a schematic structural diagram of a terminal device according to an embodiment of the present invention. The terminal device 1000 includes a determining unit 11 and a transmit unit 12.

The determining unit 11 is configured to determine transmit power of a reference signal of a first terminal device.

In MU, terminal devices transmit uplink demodulation reference signals in a multiplexing manner such as FDM, TDM, or FDM and TDM, and data or a reference signal cannot be placed on a time-frequency resource corresponding to a reference signal of another terminal device. In this case, the time-frequency resource (the time-frequency resource is also referred to as an "unavailable time-frequency resource") needs to be idle; otherwise, interference is caused to the reference signal of the another terminal device, and MU performance is affected. For the terminal device, some time-frequency resources are idle, and power allocated to the time-frequency resources is 0, but fixed power is allocated to a transmission unit in which the reference signal is located. Therefore, in this embodiment of the present invention, it is considered that the transmit power of the reference signal is associated with transmit power of an unavailable time-frequency resource in the transmission unit in which the reference signal is located, and a magnitude of transmit power that can be obtained by the reference signal is related to a quantity of unavailable time-frequency resources. In this embodiment, the determining unit 11 determines the transmit power of the reference signal of the terminal device, and the transmit power is related to the quantity of unavailable time-frequency resources in the transmission unit in which the reference signal is located. A difference from the prior art is that the transmit power of the reference signal is not only a time-frequency resource corresponding to a time-frequency resource occupied by the reference signal, but is also related to the quantity of unavailable time-frequency resources in the transmission unit in which the reference signal is located. The transmission unit may be a resource block, a resource block pair, or a user-defined time-frequency resource.

Specifically, the unavailable time-frequency resource is a time-frequency resource occupied by a reference signal of at least one other terminal device that is scheduled together with the first terminal device, and a time-frequency resource occupied by a data channel of the terminal device at least partially overlaps a time-frequency resource occupied by a data channel of the at least one other terminal device. In this embodiment, reference signals of different terminal devices that are scheduled together are multiplexed in one of the following multiplexing manners: time division multiplexing; frequency division multiplexing; and time division multiplexing and frequency division multiplexing. FIG. 3a, FIG. 3b, and FIG. 3c are schematic diagrams showing that terminal devices transmit uplink demodulation reference signals by using FDM, TDM, or FDM and TDM in multi-user.

FIG. 3a is a schematic diagram showing that terminal devices transmit uplink demodulation reference signals by using frequency division multiplexing in multi-user. UE 0 and UE 1 are two terminal devices that are scheduled together in MU-MIMO. A reference signal of the UE 0 occupies time-frequency resources in dash areas in the left picture, and a frequency-divided reference signal of the UE 1 occupies time-frequency resources in blank areas in the left picture, namely, time-frequency resources in dash areas in the right picture (the reference signal of the UE 0 and the reference signal of the UE 1 are the same in time domain, but occupy different subcarriers). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

FIG. 3b is a schematic diagram showing that terminal devices transmit uplink demodulation reference signals by using time division multiplexing in multi-user. UE 0 and UE 1 are two terminal devices that are scheduled together in MU-MIMO. A reference signal of the UE 0 occupies time-frequency resources in dash areas in the left picture, and a time-divided reference signal of the UE 1 occupies time-frequency resources in blank areas in the left picture, namely, time-frequency resources in dash areas in the right picture (the reference signal of the UE 0 and the reference signal of the UE 1 are the same in frequency domain, but are different in time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

FIG. 3c is a schematic diagram showing that terminal devices transmit uplink demodulation reference signals by using frequency division multiplexing and time division multiplexing in multi-user. UE 0 and UE 1 are two terminal devices that are scheduled together in MU-MIMO. A reference signal of the UE 0 occupies time-frequency resources in dash areas in the left picture, and a time-divided and frequency-divided reference signal of the UE 1 occupies time-frequency resources in some blank areas in the left picture (time-frequency resources in remaining blank areas are occupied by another terminal device that is scheduled together with the UE 0 and the UE 1 and that is not shown in the figure). In other words, the time-frequency resources occupied by the UE 1 are time-frequency resources in dash areas in the right picture (the reference signal of the UE 0 and the reference signal of the UE 1 are different in both frequency domain and time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

The terminal device determines the transmit power of the reference signal of the terminal device. The transmit power is related to the quantity of unavailable time-frequency resources in the transmission unit in which the reference signal is located. In a specific implementation process, in the transmission unit, particular transmit power is correspondingly allocated to each time-frequency resource based on a quantity of time-frequency resources. The reference signal occupies a particular quantity of time-frequency resources, and transmit power originally allocated to the reference signal is basic transmit power of the reference signal. In this embodiment, the transmit power of the reference signal is an accumulation of the basic transmit power of the reference signal and transmit power allocated to the unavailable time-frequency resource. This is similar to a case in which transmit power allocated to the time-frequency resource occupied by the reference signal of the at least one other terminal device that is scheduled together with the first terminal device is "borrowed" by the reference signal of the terminal device. The time-frequency resource occupied by the reference signal of the at least one other terminal device that is scheduled together with the first terminal device is a time-frequency resource in a blank area in the transmission unit of the terminal device. As the time-frequency resource in the blank area is occupied by a reference signal of another terminal device, the time-frequency resource is unavailable for the terminal device, and the transmit power allocated to the time-frequency resource is "borrowed" by the reference signal of the terminal device. In addition, a larger quantity of unavailable time-frequency resources results in higher transmit power.

The transmit unit 12 is configured to transmit the reference signal based on the transmit power.

The terminal device transmits the reference signal based on enhanced transmit power. The transmit power is an accumulation of the basic transmit power of the reference signal and the transmit power allocated to the unavailable time-frequency resource.

According to the terminal device provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and improving communication performance of the terminal device with a low signal-to-noise ratio.

Figure 7:
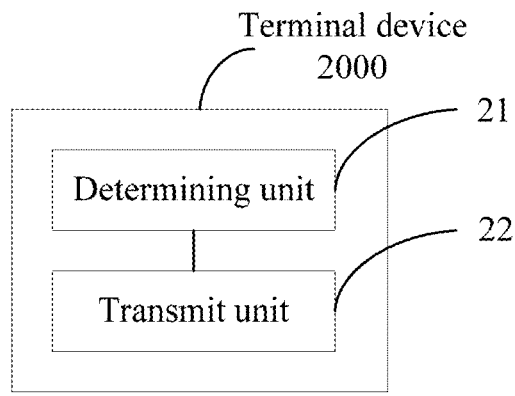
FIG. 7 is a schematic structural diagram of another terminal device according to an embodiment of the present invention.

FIG. 7 is a schematic structural diagram of another terminal device according to an embodiment of the present invention. The terminal device 2000 includes a determining unit 21 and a transmit unit 22.

The determining unit 21 is configured to determine transmit power of a reference signal of a first terminal device.

The determining unit 21 is specifically configured to:

determine a power coefficient of the transmit power of the reference signal of the first terminal device; and calculate the transmit power of the reference signal of the first terminal device based on the power coefficient.

In this embodiment, the power coefficient is used to quantize transmit power "borrowed" by the reference signal of the terminal device. The power coefficient is related to a quantity of unavailable time-frequency resources in a transmission unit in which the reference signal is located. In other words, transmit power allocated to an unavailable time-frequency resource in the transmission unit in which the reference signal is located is "borrowed" by the reference signal.

Specifically, basic power corresponding to each resource block or resource element in the transmission unit has been configured. Therefore, the terminal device can determine the power coefficient based on a pattern of the reference signal. The pattern of the reference signal indicates, in a pattern of the transmission unit, which time-frequency resource is occupied by the reference signal and which time-frequency resource is unavailable. Both the time-frequency resource occupied by the reference signal and the unavailable time-frequency resource are embodied in the pattern of the transmission unit. The transmit power allocated to the unavailable time-frequency resource may be "borrowed" by the reference signal, and the power coefficient may be determined based on the pattern of the reference signal.

Specifically, the terminal device may obtain the power coefficient of the reference signal in a plurality of manners: Manner 1: A network device determines the power coefficient of the terminal device based on the pattern of the reference signal (a DMRS pattern) of the terminal device and a signal-to-noise ratio of the terminal device, and sends the power coefficient to the terminal device; and a receiving unit (not shown) of the terminal device receives the power coefficient sent by the network device. The pattern of the reference signal of the terminal device herein is an actual pattern of the reference signal of the terminal device. The actual pattern of the reference signal of the terminal device is described relative to basic patterns of reference signals of a plurality of terminal devices in MU. An actual pattern of a reference signal of each terminal device can be determined based on the basic patterns of the reference signals of the plurality of terminal devices in the MU and a quantity of scheduled flows of each terminal device. Manner 2: The determining unit 21 is further configured to determine the power coefficient based on the pattern of the reference signal. The pattern of the reference signal herein is also an actual pattern of the reference signal of the terminal device. Manner 3: The determining unit 21 is configured to determine the power coefficient based on the pattern of the reference signal and a signal-to-noise ratio, and the transmit unit of the terminal device is configured to send the power coefficient to the network device (not shown). The pattern of the reference signal herein is also an actual pattern of the reference signal of the terminal device. It should be noted that in the foregoing manner 1 and manner 3, when the terminal device determines the power coefficient, a signal-to-noise ratio factor may be further considered. A quantity of unavailable subcarriers of each terminal device is determined based on the basic patterns of the reference signals of the plurality of terminal devices in the MU and the quantity of scheduled flows of each terminal device. In other words, a power coefficient of the terminal device is determined. When the signal-to-noise ratio is relatively high, performance loss is quite low, and "power borrowing" may not be performed; and when the signal-to-noise ratio is relatively low, if "power borrowing" is not performed, performance loss is high, and therefore "power borrowing" needs to be performed. In the manner 2, the power coefficient depends entirely on the pattern of the reference signal, and "power borrowing" needs to be performed regardless of whether the signal-to-noise ratio is high or low; and therefore the terminal device may not report the power coefficient to the network device.

After the power coefficient of the transmit power of the reference signal is determined, the transmit power of the reference signal of the terminal device is calculated based on the power coefficient. Specifically, the transmit power is a product of the power coefficient and preset basic power, and the preset basic power has been configured.

The transmit unit 22 is configured to transmit the reference signal based on the transmit power.

The transmit unit 22 transmits the reference signal based on enhanced transmit power. The transmit power is an accumulation of basic transmit power of the reference signal and the transmit power allocated to the unavailable time-frequency resource.

According to the terminal device provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and improving communication performance of the terminal device with a low signal-to-noise ratio.

Figure 8:
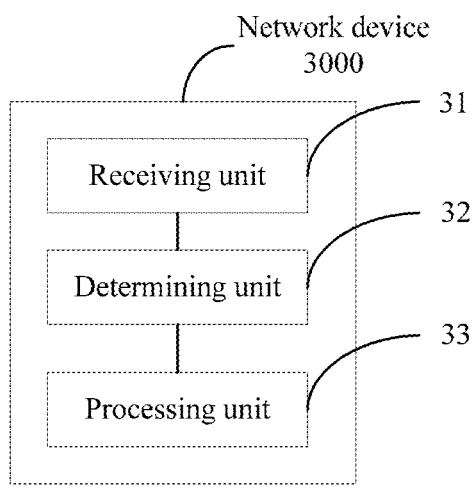
FIG. 8 is a schematic structural diagram of a network device according to an embodiment of the present invention.

FIG. 8 is a schematic structural diagram of a network device according to an embodiment of the present invention. The network device 3000 includes a receiving unit 31, a determining unit 32, and a processing unit 33.

The receiving unit 31 is configured to receive a reference signal from a first terminal device.

The determining unit 32 is configured to determine transmit power of the reference signal.

The network device needs to determine enhanced transmit power at which the terminal device transmits the reference signal. Specifically, the network device usually knows basic patterns of reference signals of a plurality of terminal devices in MU and basic transmit power corresponding to the basic patterns. Therefore, through comparison, the network device may determine enhanced transmit power of a reference signal of each terminal device based on an actual pattern of the reference signal.

The transmit power of the reference signal of the terminal device is related to a quantity of unavailable time-frequency resources in a transmission unit in which the reference signal is located. In other words, the transmit power of the reference signal is not only a time-frequency resource corresponding to a time-frequency resource occupied by the reference signal, but is also related to the quantity of unavailable time-frequency resources in the transmission unit in which the reference signal is located.

Specifically, the unavailable time-frequency resource is a time-frequency resource occupied by a reference signal of at least one other terminal device that is scheduled together with the first terminal device, and a time-frequency resource occupied by a data channel of the terminal device at least partially overlaps a time-frequency resource occupied by a data channel of the at least one other terminal device. In this embodiment, reference signals of different terminal devices that are scheduled together are multiplexed in one of the following multiplexing manners: time division multiplexing; frequency division multiplexing; and time division multiplexing and frequency division multiplexing. FIG. 3a, FIG. 3b, and FIG. 3c are schematic diagrams showing that terminal devices transmit uplink demodulation reference signals by using FDM, TDM, or FDM and TDM in multi-user.

FIG. 3a is a schematic diagram showing that terminal devices transmit uplink demodulation reference signals by using frequency division multiplexing in multi-user. UE 0 and UE 1 are two terminal devices that are scheduled together in MU-MIMO. A reference signal of the UE 0 occupies time-frequency resources in dash areas in the left picture, and a frequency-divided reference signal of the UE 1 occupies time-frequency resources in blank areas in the left picture, namely, time-frequency resources in dash areas in the right picture (the reference signal of the UE 0 and the reference signal of the UE 1 are the same in time domain, but occupy different subcarriers). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

FIG. 3b is a schematic diagram showing that terminal devices transmit uplink demodulation reference signals by using time division multiplexing in multi-user. UE 0 and UE 1 are two terminal devices that are scheduled together in MU-MIMO. A reference signal of the UE 0 occupies time-frequency resources in dash areas in the left picture, and a time-divided reference signal of the UE 1 occupies time-frequency resources in blank areas in the left picture, namely, time-frequency resources in dash areas in the right picture (the reference signal of the UE 0 and the reference signal of the UE 1 are the same in frequency domain, but are different in time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

FIG. 3c is a schematic diagram showing that terminal devices transmit uplink demodulation reference signals by using frequency division multiplexing and time division multiplexing in multi-user. UE 0 and UE 1 are two terminal devices that are scheduled together in MU-MIMO. A reference signal of the UE 0 occupies time-frequency resources in dash areas in the left picture, and a time-divided and frequency-divided reference signal of the UE 1 occupies time-frequency resources in some blank areas in the left picture (time-frequency resources in remaining blank areas are occupied by another terminal device that is scheduled together with the UE 0 and the UE 1 and that is not shown in the figure). In other words, the time-frequency resources occupied by the UE 1 are time-frequency resources in dash areas in the right picture (the reference signal of the UE 0 and the reference signal of the UE 1 are different in both frequency domain and time domain). A time-frequency resource occupied by a data channel of the UE 0 partially overlaps a time-frequency resource occupied by a data channel of the UE 1. The time-frequency resource occupied by the reference signal of the UE 1 is referred to as an unavailable time-frequency resource of the UE 0. On the contrary, the time-frequency resource occupied by the reference signal of the UE 0 is referred to as an unavailable time-frequency resource of the UE 1.

The transmit power of the reference signal is an accumulation of basic transmit power of the reference signal and transmit power allocated to the unavailable time-frequency resource. This is similar to a case in which transmit power allocated to the time-frequency resource occupied by the reference signal of the at least one other terminal device that is scheduled together with the first terminal device is "borrowed" by the reference signal of the terminal device. The time-frequency resource occupied by the reference signal of the at least one other terminal device that is scheduled together with the first terminal device is a time-frequency resource in a blank area in the transmission unit of the terminal device. As the time-frequency resource in the blank area is occupied by a reference signal of another terminal device, the time-frequency resource is unavailable for the terminal device, and the transmit power allocated to the time-frequency resource is "borrowed" by the reference signal of the terminal device. In addition, a larger quantity of unavailable time-frequency resources results in higher transmit power.

The processing unit 33 is configured to parse the reference signal based on the transmit power.

After the receiving unit 31 receives the reference signal and the determining unit 32 determines the transmit power of the reference signal, the processing unit 33 parses the reference signal based on the enhanced transmit power.

Specifically, for example, y=h*(2x), where h indicates a channel sequence, x is a reference signal sequence corresponding to basic power, and 2x is a reference signal sequence obtained after transmit power has been accumulated/enhanced (namely, double transmit power of the reference signal, where double herein is merely an example). The network device obtains y, and needs to divide y by 2x rather than x, to parse out h.

According to the network device provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

Figure 9:
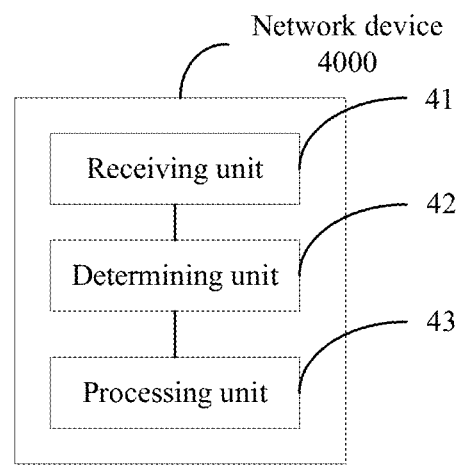
FIG. 9 is a schematic structural diagram of another network device according to an embodiment of the present invention.

FIG. 9 is a schematic structural diagram of another network device according to an embodiment of the present invention. The network device 4000 includes a receiving unit 41, a determining unit 42, and a processing unit 43.

The receiving unit 41 is configured to receive a reference signal from a first terminal device.

A function of the receiving unit 41 is the same as a function of the receiving unit 31 in the foregoing embodiment, and therefore details are not described herein again.

The determining unit 42 is configured to determine transmit power of the reference signal, where the transmit power of the reference signal is related to a quantity of unavailable time-frequency resources in a transmission unit in which the reference signal is located.

In this embodiment, the determining unit 42 is specifically configured to:

determine a power coefficient of the transmit power of the reference signal of the first terminal device, where the power coefficient is related to the quantity of unavailable time-frequency resources in the transmission unit in which the reference signal is located; and calculate the transmit power of the reference signal of the first terminal device based on the power coefficient, where the transmit power is a product of the power coefficient and preset basic power.

In this embodiment, the power coefficient is used to quantize transmit power "borrowed" by the reference signal of the terminal device. The power coefficient is related to the quantity of unavailable time-frequency resources in the transmission unit in which the reference signal is located. In other words, transmit power allocated to an unavailable time-frequency resource in the transmission unit in which the reference signal is located is "borrowed" by the reference signal.

Specifically, basic power corresponding to each resource block or resource element in the transmission unit has been configured. Therefore, the terminal device can determine the power coefficient based on a pattern of the reference signal. The pattern of the reference signal indicates, in a pattern of the transmission unit, which time-frequency resource is occupied by the reference signal and which time-frequency resource is unavailable. Both the time-frequency resource occupied by the reference signal and the unavailable time-frequency resource are embodied in the pattern of the transmission unit. The transmit power allocated to the unavailable time-frequency resource may be "borrowed" by the reference signal, and the power coefficient may be determined based on the pattern of the reference signal.

Specifically, the network device may obtain the power coefficient of the reference signal in a plurality of manners: Manner 1: The determining unit 42 is configured to determine the power coefficient of the terminal device based on the pattern of the reference signal (a DMRS pattern) of the terminal device and a signal-to-noise ratio of the terminal device, and the network device further includes a sending unit (not shown), configured to send the power coefficient to the terminal device; and the terminal device receives the power coefficient sent by the network device. The pattern of the reference signal of the terminal device herein is an actual pattern of the reference signal of the terminal device. The actual pattern of the reference signal of the terminal device is described relative to basic patterns of reference signals of a plurality of terminal devices in MU. An actual pattern of a reference signal of each terminal device can be determined based on the basic patterns of the reference signals of the plurality of terminal devices in the MU and a quantity of scheduled flows of each terminal device. Manner 2: The network device determines the power coefficient based on the pattern of the reference signal. The pattern of the reference signal herein is also an actual pattern of the reference signal of the terminal device. Manner 3: The terminal device determines the power coefficient based on the pattern of the reference signal and a signal-to-noise ratio, and reports the power coefficient to the network device. The network device further includes the receiving unit (not shown), and the receiving unit is configured to receive the power coefficient sent by the first terminal device. The pattern of the reference signal herein is also an actual pattern of the reference signal of the terminal device. It should be noted that in the foregoing manner 1 and manner 3, when the terminal device determines the power coefficient, a signal-to-noise ratio factor may be further considered. A quantity of unavailable subcarriers of each terminal device is determined based on the basic patterns of the reference signals of the plurality of terminal devices in the MU and the quantity of scheduled flows of each terminal device. In other words, a power coefficient of the terminal device is determined. When the signal-to-noise ratio is relatively high, performance loss is quite low, and "power borrowing" may not be performed; and when the signal-to-noise ratio is relatively low, if "power borrowing" is not performed, performance loss is high, and therefore "power borrowing" needs to be performed. In the manner 2, the power coefficient depends entirely on the pattern of the reference signal, and "power borrowing" needs to be performed regardless of whether the signal-to-noise ratio is high or low; and therefore the terminal device may not report the power coefficient to the network device.

After the power coefficient of the transmit power of the reference signal is determined, the transmit power of the reference signal of the terminal device is calculated based on the power coefficient. Specifically, the transmit power is a product of the power coefficient and preset basic power, and the preset basic power has been configured.

The processing unit 43 is configured to parse the reference signal based on the transmit power.

Likewise, after receiving the reference signal of the terminal device, the network device may calculate the transmit power of the reference signal of the terminal device based on the power coefficient that is of the transmit power of the reference signal of the terminal device and that is obtained in the foregoing three manners.

According to the technical solution provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

Figure 10:
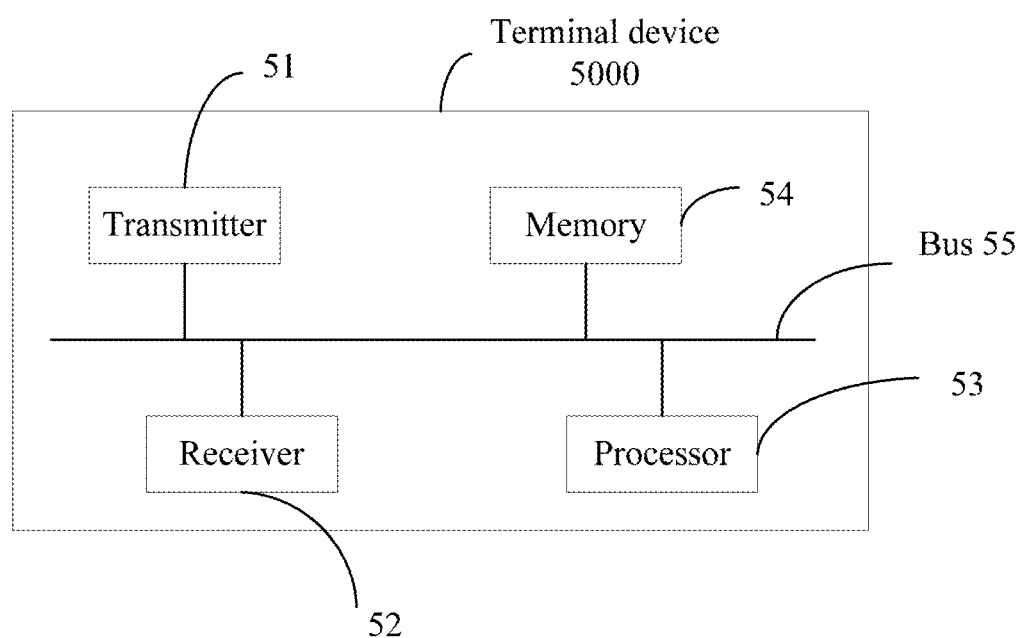
FIG. 10 is a schematic structural diagram of still another terminal device according to an embodiment of the present invention.

FIG. 10 is a schematic structural diagram of still another terminal device according to an embodiment of the present invention. The terminal device 5000 may include a transmitter 51, a receiver 52, a processor 53, and a memory 54. The transmitter 51, the receiver 52, the processor 53, and the memory 54 are separately connected to a bus 45.

The processor 53 controls an operation of the terminal device 5000. The processor 53 may also be referred to as a central processing unit (CPU). The processor 53 may be an integrated circuit chip and has a signal processing capability. Alternatively, the processor 53 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The general purpose processor may be a microprocessor, or the processor may be any conventional processor or the like.

The memory 54 stores a set of program code. The processor 53 is configured to invoke the program code stored in the memory 54, to perform the following operations:

determining transmit power of a reference signal of a first terminal device, where the transmit power is related to a quantity of unavailable time-frequency resources in a transmission unit in which the reference signal is located; and transmitting the reference signal based on the transmit power by using the transmitter.

In this implementation, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and further improving communication performance of the terminal device with a low signal-to-noise ratio.

In an implementation, the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

In this implementation, the terminal device specifically relates the transmit power of the reference signal of the terminal device to a time-frequency resource occupied by a reference signal of another terminal device that is scheduled together with the terminal device in the transmission unit in which the reference signal is located, thereby improving the transmit power of the reference signal of the terminal device in uplink MU-MIMO, and further improving communication performance of the terminal device with a low signal-to-noise ratio.

In another implementation, the reference signal is a demodulation reference signal or a sounding reference signal.

In still another implementation, reference signals of different terminal devices that are scheduled together are multiplexed in one of the following multiplexing manners: time division multiplexing; frequency division multiplexing; and time division multiplexing and frequency division multiplexing.

In this implementation, all the multiplexing manners, namely, time division multiplexing, frequency division multiplexing, and time division multiplexing and frequency division multiplexing, may be used to schedule the reference signals of the different terminal devices. This can avoid a problem that orthogonality of the demodulation reference signal for which cyclic shift is used deteriorates when bandwidth of the terminal devices in uplink MU-MIMO partially overlaps.

In still another implementation, a larger quantity of unavailable time-frequency resources results in higher transmit power.

In this implementation, a larger quantity of unavailable time-frequency resources results in higher transmit power borrowed by the reference signal, and higher eventual transmit power of the reference signal.

In still another implementation, that the processor 53 performs the step of determining transmit power of a reference signal of a first terminal device includes:

determining a power coefficient of the transmit power of the reference signal of the first terminal device, where the power coefficient is related to the quantity of unavailable time-frequency resources in the transmission unit in which the reference signal is located; and calculating the transmit power of the reference signal of the first terminal device based on the power coefficient, where the transmit power is a product of the power coefficient and preset basic power.

In this implementation, the quantity of unavailable time-frequency resources in the transmission unit in which the reference signal is located is measured by using the power coefficient, so that the quantity of unavailable time-frequency resources in the transmission unit in which the reference signal is located can be quantized, and the transmit power of the reference signal is the product of the power coefficient and the preset basic power.

In still another implementation, that the processor 53 determines a power coefficient of the transmit power of the reference signal of the first terminal device includes:

receiving the power coefficient sent by a network device, where the power coefficient is determined based on a pattern of the reference signal and a signal-to-noise ratio of the first terminal device.

In this implementation, the power coefficient is determined by the network device, and the terminal device receives the power coefficient sent by the network device.

In still another implementation, that the processor 53 performs the step of determining a power coefficient of the transmit power of the reference signal of the first terminal device includes:

determining the power coefficient based on a pattern of the reference signal. In this implementation, a time-frequency resource and an unavailable time-frequency resource of the reference signal are clearly illustrated in the pattern of the reference signal, and the power coefficient is related to the quantity of unavailable time-frequency resources in the transmission unit in which the reference signal is located. Therefore, the power coefficient can be determined based on the pattern of the reference signal.

In still another implementation, that the processor 53 performs the step of determining a power coefficient of the transmit power of the reference signal of the first terminal device includes:

determining the power coefficient based on a pattern of the reference signal and a signal-to-noise ratio; and the processor 53 further performs the following step:
sending the power coefficient to a network device.

In this implementation, the terminal device determines the power coefficient based on the pattern of the reference signal and the signal-to-noise ratio, and sends the determined power coefficient to the network device. When the signal-to-noise ratio is relatively low, the transmit power of the reference signal of the terminal device needs to be calculated based on the power coefficient, to resolve a problem that communication performance is affected when performance loss of the terminal device with a low signal-to-noise ratio is excessively high.

According to the terminal device provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO, and improving communication performance of the terminal device with a low signal-to-noise ratio.

Figure 11:
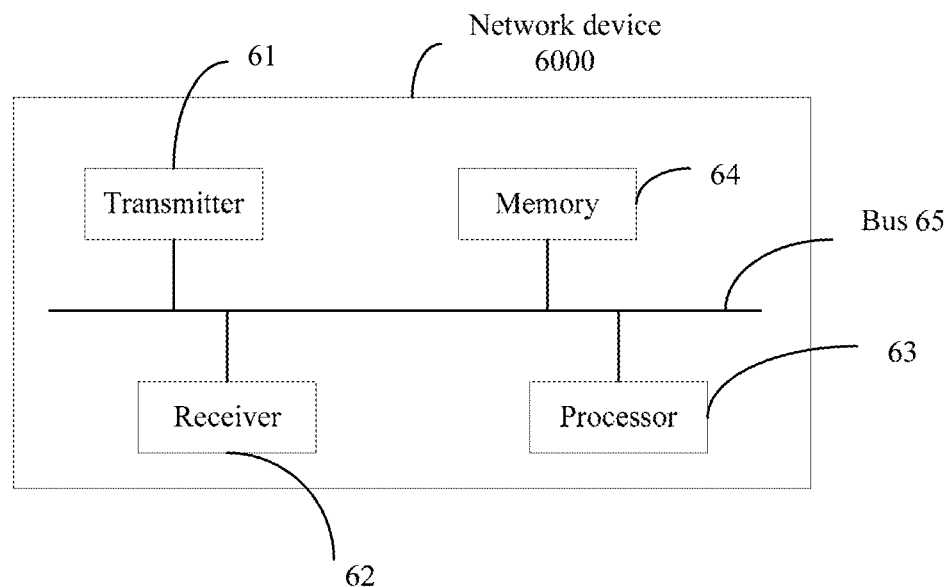
FIG. 11 is a schematic structural diagram of still another network device according to an embodiment of the present invention.

FIG. 11 is a schematic structural diagram of still another network device according to an embodiment of the present invention. The network device 6000 may include a transmitter 61, a receiver 62, a processor 63, and a memory 64. The transmitter 61, the receiver 62, the processor 63, and the memory 64 are separately connected to a bus 65.

The processor 63 controls an operation of the network device 6000. The processor 63 may also be referred to as a central processing unit (CPU). The processor 63 may be an integrated circuit chip and has a signal processing capability. Alternatively, the processor 63 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The general purpose processor may be a microprocessor, or the processor may be any conventional processor or the like.

The memory 64 stores a set of program code. The processor 63 is configured to invoke the program code stored in the memory 64, to perform the following operations:

receiving a reference signal from a first terminal device by using the receiver;

determining transmit power of the reference signal, where the transmit power of the reference signal is related to a quantity of unavailable time-frequency resources in a transmission unit in which the reference signal is located; and parsing the reference signal based on the transmit power.

In this implementation, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

In an implementation, the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

In this implementation, the transmit power of the reference signal of the first terminal device is specifically related to a time-frequency resource occupied by a reference signal of another second terminal device that is scheduled together with the first terminal device in the transmission unit in which the reference signal is located, thereby improving the transmit power of the reference signal of the first terminal device in uplink MU-MIMO, and improving communication performance between the first terminal device with a low signal-to-noise ratio and the network device.

In another implementation, the reference signal is a demodulation reference signal or a sounding reference signal.

In still another implementation, reference signals of different terminal devices that are scheduled together are multiplexed in one of the following multiplexing manners: time division multiplexing; frequency division multiplexing; and time division multiplexing and frequency division multiplexing.

In this implementation, all the multiplexing manners, namely, time division multiplexing, frequency division multiplexing, and time division multiplexing and frequency division multiplexing, may be used to schedule the reference signals of the different terminal devices. This can avoid a problem that orthogonality of the demodulation reference signal for which cyclic shift is used deteriorates when bandwidth of the terminal devices in uplink MU-MIMO partially overlaps.

In still another implementation, a larger quantity of unavailable time-frequency resources results in higher transmit power.

In this implementation, a larger quantity of unavailable time-frequency resources results in higher transmit power borrowed by the reference signal, and higher eventual transmit power of the reference signal.

In still another implementation, that the processor 63 performs the step of determining transmit power of the reference signal includes:

determining a power coefficient of the transmit power of the reference signal of the first terminal device, where the power coefficient is related to the quantity of unavailable time-frequency resources in the transmission unit in which the reference signal is located; and calculating the transmit power of the reference signal of the first terminal device based on the power coefficient, where the transmit power is a product of the power coefficient and preset basic power.

In this implementation, the quantity of unavailable time-frequency resources in the transmission unit in which the reference signal is located is measured by using the power coefficient, so that the quantity of unavailable time-frequency resources in the transmission unit in which the reference signal is located can be quantized, and the transmit power of the reference signal is the product of the power coefficient and the preset basic power.

In still another implementation, that the processor 63 performs the step of determining a power coefficient of the transmit power of the reference signal of the first terminal device includes:

determining the power coefficient based on a pattern of the reference signal and a signal-to-noise ratio of the first terminal device; and the processor 63 is further configured to perform the following step:

sending the power coefficient to the first terminal device.

In this implementation, the power coefficient is determined by the network device, and the determined power coefficient is sent to the terminal device.

In still another implementation, that the processor 63 performs the step of determining a power coefficient of the transmit power of the reference signal of the first terminal device includes:

determining the power coefficient based on a pattern of the reference signal.

In this implementation, a time-frequency resource and an unavailable time-frequency resource of the reference signal are clearly illustrated in the pattern of the reference signal, and the power coefficient is related to the quantity of unavailable time-frequency resources in the transmission unit in which the reference signal is located. Therefore, the power coefficient can be determined based on the pattern of the reference signal.

In still another implementation, that the processor 63 performs the step of determining a power coefficient of the transmit power of the reference signal of the first terminal device includes:

receiving the power coefficient sent by the first terminal device, where the power coefficient is determined based on a pattern of the reference signal and a signal-to-noise ratio of the first terminal device.

In this implementation, the terminal device determines the power coefficient based on the pattern of the reference signal and the signal-to-noise ratio; and the network device receives the determined power coefficient sent by the terminal device. When the signal-to-noise ratio is relatively low, the transmit power of the reference signal of the terminal device needs to be calculated based on the power coefficient, to resolve a problem that communication performance is affected when performance loss of the terminal device with a low signal-to-noise ratio is excessively high.

According to the network device provided in this embodiment of the present invention, the terminal device relates the transmit power of the reference signal of the terminal device to the quantity of unavailable time-frequency resources in the transmission unit in which the reference signal is located, thereby improving the transmit power of the reference signal of the terminal device in uplink MU-MIMO; and the network device parses the reference signal based on the improved transmit power of the reference signal, thereby improving communication performance between the terminal device with a low signal-to-noise ratio and the network device.

Figure 12:
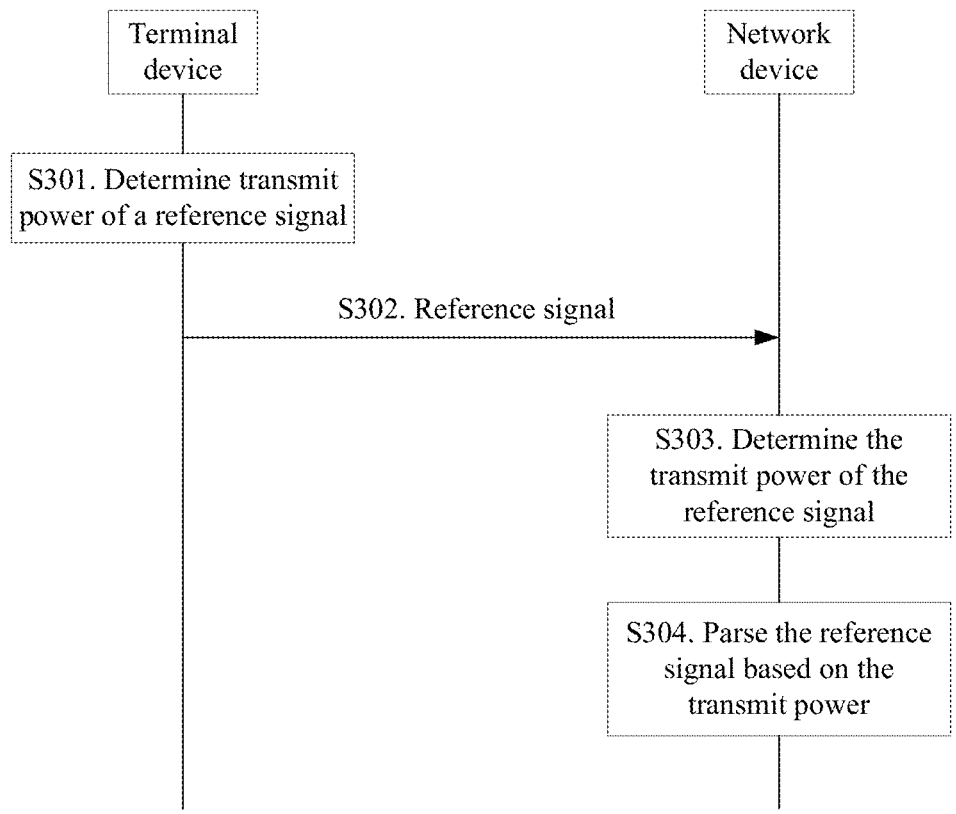
FIG. 12 is a schematic interactive diagram of still another reference signal sending and receiving method according to an embodiment of the present invention.

FIG. 12 is a schematic interactive diagram of still another reference signal sending and receiving method according to an embodiment of the present invention. The method may include the following steps:

S301. A terminal device determines transmit power of a reference signal, where power of an orthogonal frequency division multiplexing OFDM symbol on which the reference signal is located is the same as power of OFDM on which data is located, and power of a resource element occupied by the reference signal is boosted.

S302. The terminal device sends the reference signal based on the transmit power, and a network device receives the reference signal.

S303. The network device determines the transmit power of the reference signal, where the power of the orthogonal frequency division multiplexing OFDM symbol on which the reference signal is located is the same as the power of the OFDM on which the data is located, and the power of the resource element occupied by the reference signal is boosted.

S304. The network device parses the reference signal based on the transmit power.

In this embodiment, the transmit power of the reference signal is an accumulation of basic transmit power of the reference signal and transmit power allocated to an unavailable time-frequency resource. This is similar to a case in which transmit power allocated to a time-frequency resource occupied by a reference signal of at least one other terminal device that is scheduled together with the terminal device is "borrowed" (power boosting) by the reference signal of the terminal device. The time-frequency resource occupied by the reference signal of the at least one other terminal device that is scheduled together with the terminal device is a time-frequency resource in a blank area in a transmission unit of the terminal device. As the time-frequency resource in the blank area is occupied by a reference signal of another terminal device, the time-frequency resource is unavailable for the terminal device, and the transmit power allocated to the time-frequency resource is "borrowed" by the reference signal of the terminal device.

During determining of the transmit power of the reference signal, the power of the OFDM symbol on which the reference signal is located needs to be kept the same as the power of the OFDM on which the data is located, and the power of the resource element (RE) occupied by the reference signal is boosted. The OFDM symbol herein on which the reference signal is located is each OFDM symbol. The transmit power of the reference signal cannot be boosted without a limitation, and the power of the OFDM symbol on which the reference signal is located needs to be kept the same as the power of the OFDM on which the data is located. In addition, the "borrowed" transmit power is "borrowed" by the reference signal of the terminal device. In other words, the power of the RE occupied by the reference signal is boosted, but power of an RE, occupied by data, on the OFDM symbol is not boosted.

Figure 13A:
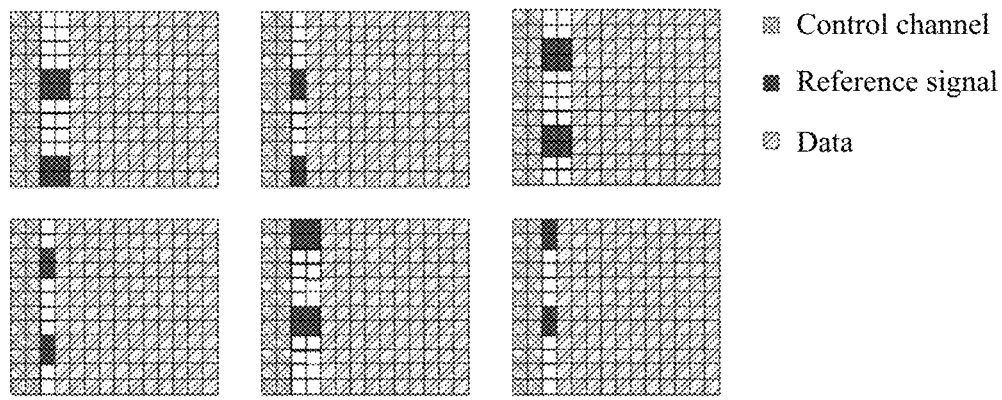
FIG. 13a to FIG. 13c are schematic diagrams of examples of multiplexing of a plurality of reference signals.
Figure 13B:
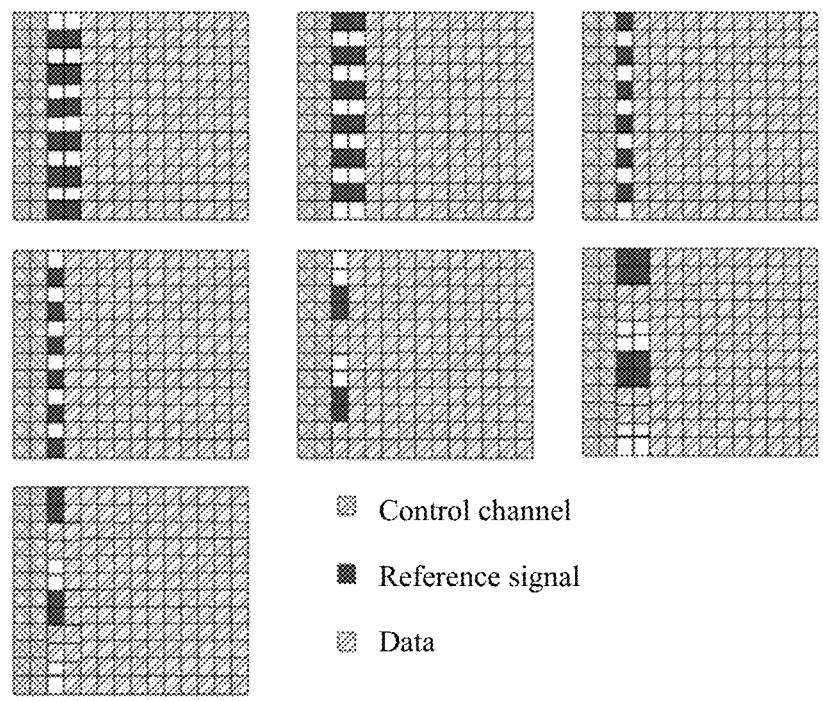
Figure 13C:
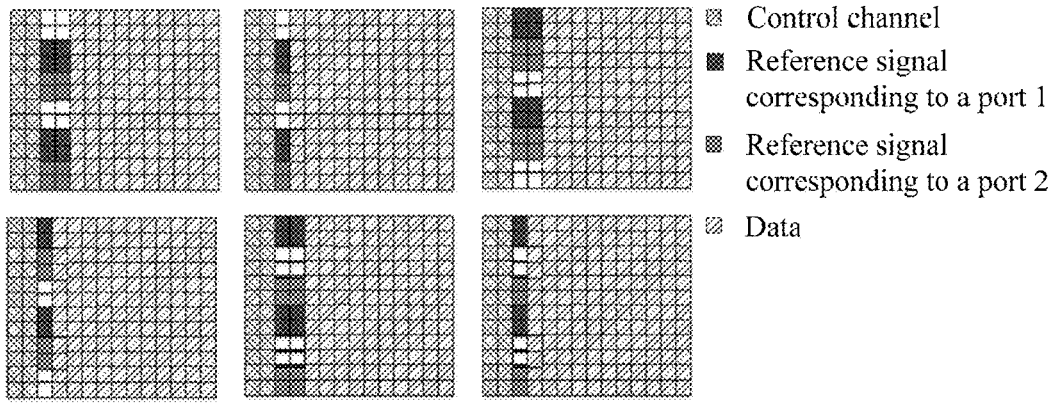

FIG. 13a to FIG. 13c are schematic diagrams of multiplexing of a plurality of reference signals. In these schematic diagrams, a reference signal may occupy one symbol or two consecutive symbols in time domain, and a reference signal may occupy one subcarrier or two consecutive subcarriers in frequency domain. For a terminal device, reference signals corresponding to one port or two ports may be multiplexed.

After receiving a reference signal, a network device determines enhanced transmit power of the reference signal in a same manner, and parses the reference signal based on the enhanced transmit power. Specifically, for example, y=h*(2x), where h indicates a channel sequence, x is a reference signal sequence corresponding to basic power, and 2x is a reference signal sequence obtained after transmit power has been accumulated/enhanced (namely, double transmit power of the reference signal, where double herein is merely an example). The network device obtains y, and needs to divide y by 2x rather than x, to parse out h.

Further, before S301, the method may further include the following steps:

sending, by the network device, instruction information to the terminal device, where the instruction information is used to instruct to boost power of the reference signal; and receiving, by the terminal device, the instruction information.

In this implementation, the network device needs to instruct the terminal device whether to boost the power of the reference signal, namely, whether to perform power boosting. The terminal device performs a subsequent power boosting operation only after receiving the instruction.

According to the reference signal sending and receiving method provided in this embodiment of the present invention, the power of the OFDM symbol on which the reference signal is located is kept the same as the power of the OFDM on which the data is located, and the power of the resource element occupied by the reference signal is boosted, thereby improving the transmit power of the reference signal of the terminal device in uplink MU-MIMO, and improving communication performance of the terminal device with a low signal-to-noise ratio.

Figure 14:
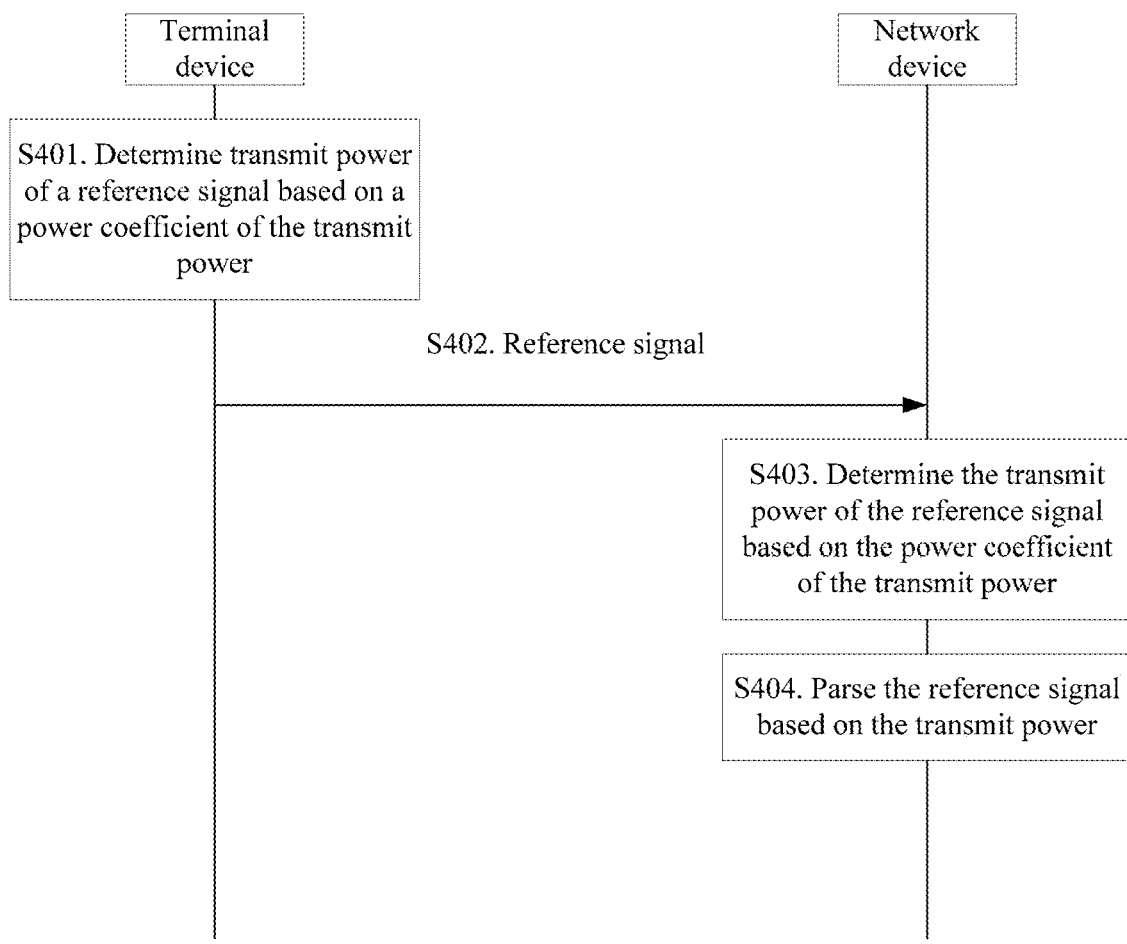
FIG. 14 is a schematic interactive diagram of still another reference signal sending and receiving method according to an embodiment of the present invention.

FIG. 14 is a schematic interactive diagram of still another reference signal sending and receiving method according to an embodiment of the present invention. The method may include the following steps:

S401. A terminal device determines transmit power of a reference signal based on a power coefficient Powerboosting of the transmit power, where the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of the terminal device.

S402. The terminal device sends the reference signal based on the transmit power, and a network device receives the reference signal.

S403. The network device determines the transmit power of the reference signal based on the power coefficient of the transmit power, where the power coefficient is related to at least one of the following parameters: the quantity of unavailable resource elements, the quantity of resource elements occupied by the reference signal, the quantity of resource elements on the orthogonal frequency division multiplexing OFDM symbol on which the reference signal is located, the quantity of resource elements on the OFDM symbol that are occupied by the data, the quantity of port groups corresponding to the frequency-division multiplexed reference signal in the cell, and the quantity of port groups corresponding to the frequency-division multiplexed reference signal of the terminal device.

S404. The network device parses the reference signal based on the transmit power.

In this embodiment, the power coefficient is used to quantize transmit power "borrowed" by the reference signal of the terminal device. The power coefficient is related to the foregoing plurality of parameters.

The transmit power, the power coefficient, and basic transmit power meet the following relationship:

20*lg(Power coefficient)=10*lg(Transmit power/Basic transmit power).

Specifically, in an implementation, the power coefficient is:

$$Powerboosting = \sqrt{\frac{N_{Mute}REs + N_{DMRS} + REs}{N_{DMRS}REs}},$$

where $N_{Mute}REs$ is the quantity of unavailable resource elements, and $N_{RS}REs$ is the quantity of resource elements occupied by the reference signal.

In FIG. 13a, $N_{Mute}REs$ is 4 and $N_{RS}REs$ is 2, and therefore the power coefficient is $$\sqrt{\frac{3}{1}}.$$

In FIG. 13b, $N_{Mute}$REs is 6 and $N_{RS}$REs is 6, and therefore the power coefficient is $$\sqrt{\frac{2}{1}}.$$

In FIG. 13c, $N_{Mute}$REs is 2 and $N_{RS}$REs is 4, and therefore the power coefficient is $$\sqrt{\frac{3}{2}}.$$

In another implementation, the power coefficient is:

$$Powerboosting = \sqrt{\frac{N_{Total}REs - N_{Data}REs}{N_{DMRS}REs}},$$

where $N_{RS}$REs is the quantity of resource elements occupied by the reference signal, $N_{Total}$REs is the quantity of resource elements on the OFDM symbol on which the reference signal is located, and $N_{Data}$REs is the quantity of resource elements on the OFDM symbol that are occupied by the data; and this calculation formula of the power coefficient is a variant of the calculation formula in the foregoing implementation, and details are not described herein again.

In still another implementation, the power coefficient is:

$$Powerboosting = \sqrt{\frac{CDM_{Cell}}{CDM_{UE}}},$$

where $CDM_{Cell}$ is the quantity of port groups corresponding to the frequency-division multiplexed reference signal in the cell, and $CDM_{UE}$ is the quantity of port groups corresponding to the frequency-division multiplexed reference signal of the terminal device.

In FIG. 13c, $CDM_{Cell}$ is 3 and $CDM_{UE}$ is 2, and therefore the power coefficient is $$\sqrt{\frac{3}{2}}.$$

$Powerboosting = \sqrt{CDM_{Cell}}$, where $CDM_{Cell}$ is the quantity of port groups corresponding to the frequency-division multiplexed reference signal in the cell.

In FIG. 13c, $CDM_{Cell}$ is 3, and therefore the power coefficient is $\sqrt{3}$.

According to the reference signal sending and receiving method provided in this embodiment of the present invention, the power coefficient of the reference signal may be determined by using a plurality of parameters, to determine the transmit power, thereby improving the transmit power of the reference signal of the terminal device in uplink MU-MIMO, and improving communication performance of the terminal device with a low signal-to-noise ratio.

Figures 15, 16A:
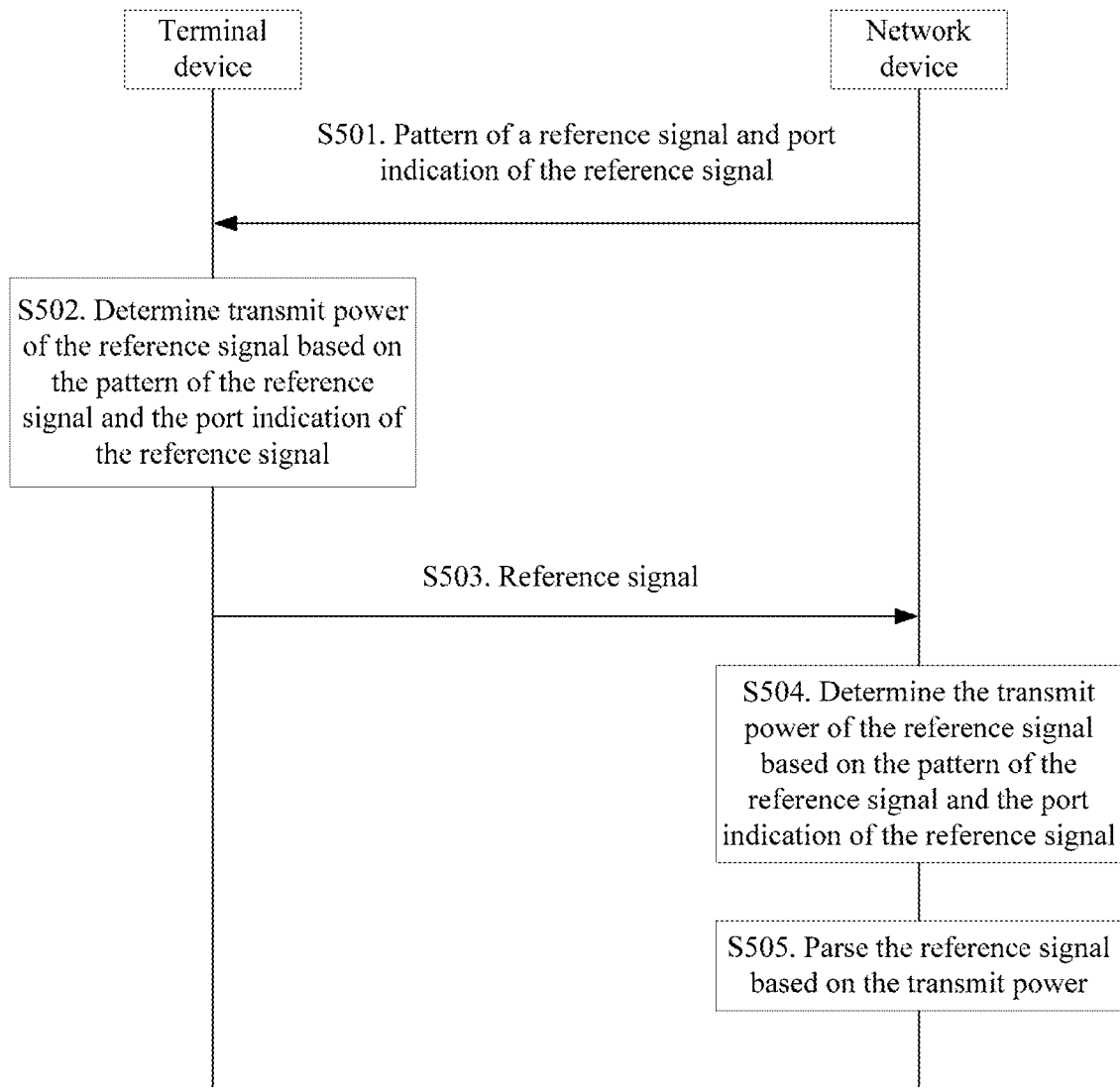
FIG. 15 is a schematic interactive diagram of still another reference signal sending and receiving method according to an embodiment of the present invention.
FIG. 16a and FIG. 16b are schematic diagrams of examples of a correspondence between a port indication of a reference signal and a power coefficient.

FIG. 15 is a schematic interactive diagram of still another reference signal sending and receiving method according to an embodiment of the present invention. The method may include the following steps:

S501. A network device sends a pattern of a reference signal and a port indication of the reference signal to a terminal device, and the terminal device receives the pattern of the reference signal and the port indication of the reference signal that are sent by the network device.

S502. The terminal device determines transmit power of the reference signal based on the pattern of the reference signal and the port indication of the reference signal.

S503. The terminal device sends the reference signal based on the transmit power, and the network device receives the reference signal sent by the terminal device.

S504. The network device determines the transmit power of the reference signal based on the pattern of the reference signal and the port indication of the reference signal.

S505. The network device parses the reference signal based on the transmit power.

The pattern of the reference signal includes a quantity of OFDM symbols occupied by the reference signal and a type of the reference signal. The quantity of OFDM symbols occupied by the reference signal indicates whether the reference signal occupies one OFDM symbol or occupies two OFDM symbols in time domain. The type of the reference signal includes that the reference signal occupies one subcarrier or two consecutive subcarriers in frequency domain. As shown in FIG. 13a, in some schematic diagrams, a reference signal occupies two OFDM symbols in time domain and occupies two consecutive subcarriers in frequency domain. In some schematic diagrams, a reference signal occupies one OFDM symbol in time domain and occupies one consecutive subcarrier in frequency domain.

However, a specific mapping location of the reference signal cannot be determined exactly based on the quantity of OFDM symbols occupied by the reference signal and the type of the reference signal. In this embodiment, the specific mapping location of the reference signal is determined based on both the pattern of the reference signal and the port indication of the reference signal, thereby determining the transmit power of the reference signal.

Figures 16B, 17:
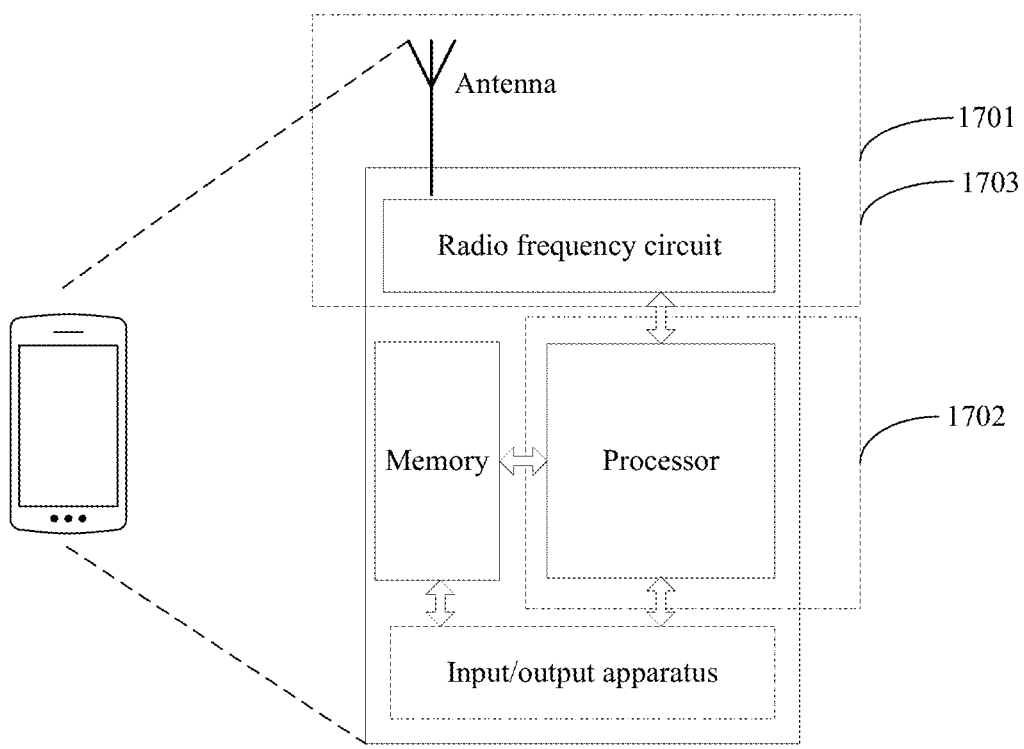
FIG. 17 is a schematic diagram of a simplified hardware architecture of a terminal device.

In this embodiment, a type of each reference signal corresponds to a correspondence between a port indication of the reference signal and a power coefficient, and each correspondence includes a correspondence between at least one port indication of a reference signal and at least one power coefficient of transmit power. FIG. 16a and FIG. 16b show two correspondences between a port indication of a reference signal and a power coefficient.

S502 specifically includes:

determining one correspondence from a plurality of correspondences based on the pattern of the reference signal, where each correspondence includes a correspondence between at least one port indication of a reference signal and at least one power coefficient of transmit power;

determining, in the determined correspondence based on the port indication of the reference signal, a power coefficient corresponding to the received port indication of the reference signal; and determining the transmit power based on the power coefficient.

Specifically, a correspondence table between the port indication of the reference signal and the power coefficient can be determined based on the type of the reference signal, and then the corresponding power coefficient can be determined based on the port indication that is of the reference signal and that is indicated by the network device. The port indication is A1, A2, ..., C1, C2, ..., or the like in FIG. 16a or A1, A2, ..., B1, B2, ..., or the like in FIG. 16b. The port indication has 4 to 6 bits.

For example, the network device may indicate the pattern of the reference signal by using RRC signaling, and add the port indication of the reference signal to DCI information.

According to the reference signal sending and receiving method provided in this embodiment of the present invention, the transmit power of the reference signal may be determined based on the pattern of the reference signal and the port indication of the reference signal, and the transmit power of the reference signal is boosted, thereby improving the transmit power of the reference signal of the terminal device in uplink MU-MIMO, and improving communication performance of the terminal device with a low signal-to-noise ratio.

FIG. 17 is a simplified schematic structural diagram of a terminal device. For ease of understanding and illustration, in FIG. 17, the terminal device is a mobile phone as an example. As shown in FIG. 17, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display, or a keyboard, is mainly configured to: receive data entered by a user, and output data to the user. It should be noted that some types of terminal devices may not have an input/output apparatus.

When data needs to be sent, after performing baseband processing on the to-be-sent data, the processor outputs a baseband signal to the radio frequency circuit; and after performing radio frequency processing on the baseband signal, the radio frequency circuit sends a radio frequency signal in an electromagnetic wave form by using the antenna. When data needs to be sent to the terminal device, the radio frequency circuit receives a radio frequency signal by using the antenna, converts the radio frequency signal into a baseband signal, and outputs the baseband signal to the processor; and the processor converts the baseband signal into data and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated together with the processor. This is not limited in this embodiment of this application.

In this embodiment of this application, the antenna and the radio frequency circuit that have sending and receiving functions may be considered as a receiving unit and a sending unit (which may also be collectively referred to as a transceiver unit) of the terminal device, and the processor having a processing function is considered as a processing unit of the terminal device. As shown in FIG. 17, the terminal device includes a receiving unit 1701, a processing unit 1702, and a sending unit 1703. The receiving unit 1701 may also be referred to as a receiver, a receiver, a receiver circuit, or the like. The sending unit 1703 may also be referred to as a sender, a transmitter, a transmitter, a transmitter circuit, or the like. The processing unit may also be referred to as a processor, a processing board, a processing module, a processing apparatus, or the like.

For example, in an embodiment, the processing unit 1702 is configured to perform step S301 in the embodiment shown in FIG. 12, and the sending unit 1703 is configured to perform step S302 in the embodiment shown in FIG. 12.

For another example, in another embodiment, the processing unit 1702 is configured to perform step S401 in the embodiment shown in FIG. 14, and the sending unit 1703 is configured to perform step S402 in the embodiment shown in FIG. 14.

For another example, in still another embodiment, the receiving unit 1701 is configured to perform step S501 in the embodiment shown in FIG. 15, the processing unit 1702 is configured to perform step S502 in the embodiment shown in FIG. 15, and the sending unit 1703 is configured to perform step S503 in the embodiment shown in FIG. 15.

Figure 18:
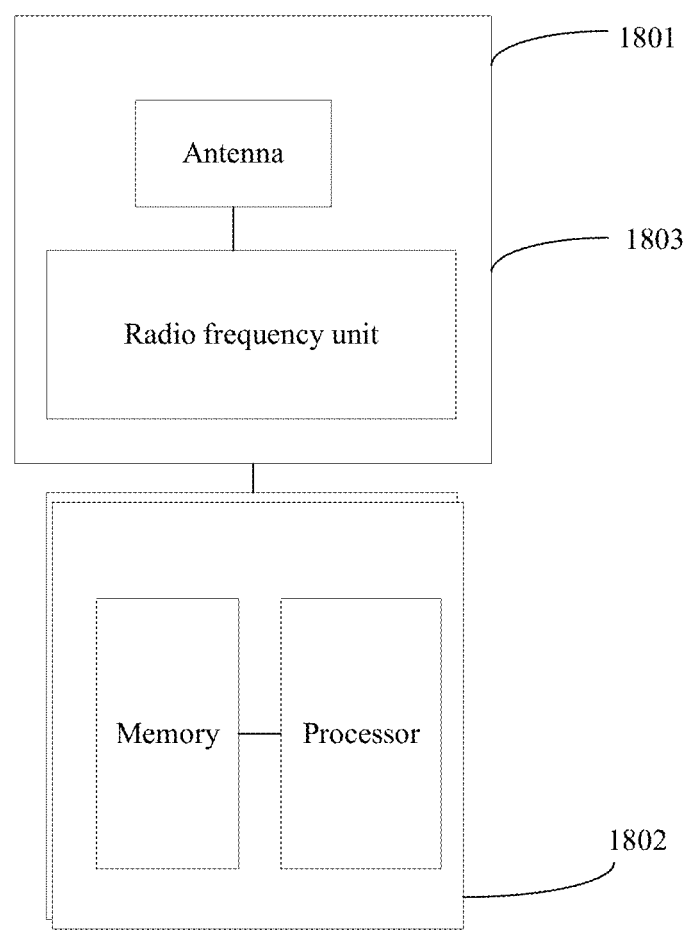
FIG. 18 is a schematic diagram of a simplified hardware architecture of a network device.

FIG. 18 is a simplified schematic structural diagram of a network device. The network device includes a radio frequency signal transceiving and converting part and a part 1802. The radio frequency signal transceiving and converting part further includes a receiving unit 1801 and a sending unit 1803 (which may also be collectively referred to as a transceiver unit). The radio frequency signal transceiving and converting part is mainly configured to: send and receive a radio frequency signal, and perform conversion between the radio frequency signal and a baseband signal. The part 1802 is mainly configured to: perform baseband processing, control the network device, and the like. The receiving unit 1801 may also be referred to as a receiver, a receiver, a receiver circuit, or the like. The sending unit 1803 may also be referred to as a sender, a transmitter, a transmitter, a transmitter circuit, or the like. The part 1802 is usually a control center of the network device, and may usually be referred to as a processing unit.

The part 1802 may include one or more boards. Each board may include one or more processors and one or more memories. The processor is configured to read and execute a program in the memory, to implement a baseband processing function and control over the network device. If there are a plurality of boards, the boards may be interconnected, to increase a processing capability. In an optional implementation, the plurality of boards may share one or more processors, or the plurality of boards may share one or more memories, or the plurality of boards simultaneously share one or more processors.

For example, in an embodiment, the receiving unit 1801 is configured to perform step S302 in the embodiment shown in FIG. 12, and the processing unit 1802 is configured to perform steps S303 and S304 in the embodiment shown in FIG. 12.

For another example, in another embodiment, the receiving unit 1801 is configured to perform step S402 in the embodiment shown in FIG. 14, and the processing unit 1802 is configured to perform steps S403 and S404 in the embodiment shown in FIG. 14.

For still another example, in still another embodiment, the sending unit 1803 is configured to perform step S501 in the embodiment shown in FIG. 15, the receiving unit 1801 is configured to perform step S503 in the embodiment shown in FIG. 15, and the processing unit 1802 is configured to perform steps S504 and S505 in the embodiment shown in FIG. 15.

In another optional implementation, as a system-on-a-chip (SoC for short) technology develops, all or some functions of the part 1802 and the part 1801 may be implemented by using the SoC technology, for example, implemented by a function chip in a base station. Devices such as a processor, a memory, and an antenna interface are integrated into the function chip in the base station. A program with a related function of the base station is stored in the memory, and the processor executes the program to implement the related function of the base station. Optionally, the function chip in the base station can also read a memory outside the chip, to implement the related function of the base station.

In the specification, claims, and accompanying drawings of the present invention, the terms "first", "second", "third", "fourth", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

In the foregoing embodiments, the descriptions of the embodiments have respective focuses. For a part that is not described in detail in an embodiment, refer to related descriptions in other embodiments.

Based on descriptions of the foregoing implementations, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following is taken as an example but is not limited: The computer-readable medium may include a random access memory (RAM), a read-only memory (ROM), an electrically erasable programmable read-only memory (EEPROM), a compact disc read-only memory (CD-ROM) or another optical disk storage, a disk storage medium or another disk storage device, or any other medium that can be used to carry or store expected program code in a command or data structure form and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definitions of a medium to which they belong. For example, a disk and disc used by the present invention includes a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

1. A reference signal sending method comprising: determining transmit power of a reference signal of a first terminal device, wherein the transmit power is related to a quantity of unavailable time-frequency resources in a transmission unit in which the reference signal is located; and transmitting the reference signal based on the transmit power.

2. The method according to paragraph number 1 above, wherein the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

3. The method according to paragraph number 1 above, wherein a large quantity of unavailable time-frequency resources results in higher transmit power.

4. The method according to paragraph number 1 above, wherein the determining transmit power of a reference signal of a first terminal device comprises: determining a power coefficient of the transmit power of the reference signal of the first terminal device, wherein the power coefficient is related to the quantity of unavailable time-frequency resources in the transmission unit in which the reference signal is located; and calculating the transmit power of the reference signal of the first terminal device based on the power coefficient, wherein the transmit power is a product of the power coefficient and preset basic power.

5. The method according to paragraph number 4 above, wherein the determining a power coefficient of the transmit power of the reference signal of the first terminal device comprises: receiving the power coefficient sent by a network device, wherein the power coefficient is determined based on a pattern of the reference signal and a signal-to-noise ratio of the first terminal device.

6. The method according to paragraph number 4 above, wherein the determining a power coefficient of the transmit power of the reference signal of the first terminal device comprises: determining the power coefficient based on a pattern of the reference signal.

7. The method according to paragraph number 4 above, wherein the determining a power coefficient of the transmit power of the reference signal of the first terminal device comprises: determining the power coefficient based on a pattern of the reference signal and a signal-to-noise ratio; and the method further comprises: sending the power coefficient to a network device.

8. A reference signal receiving method comprising: receiving a reference signal from a first terminal device; determining transmit power of the reference signal, wherein the transmit power of the reference signal is related to a quantity of unavailable time-frequency resources in a transmission unit in which the reference signal is located; and parsing the reference signal based on the transmit power.

9. The method according to paragraph number 8 above, wherein the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

10. The method according to paragraph number 8 above, wherein a larger quantity of unavailable time-frequency resources results in higher transmit power.

11. The method according to paragraph number 8 above, wherein the determining transmit power of the reference signal comprises: determining a power coefficient of the transmit power of the reference signal of the first terminal device, wherein the power coefficient is related to the quantity of unavailable time-frequency resources in the transmission unit in which the reference signal is located; and calculating the transmit power of the reference signal of the first terminal device based on the power coefficient, wherein the transmit power is a product of the power coefficient and preset basic power.

12. The method according to paragraph number 11 above, wherein the determining a power coefficient of the transmit power of the reference signal of the first terminal device comprises: determining the power coefficient based on a pattern of the reference signal and a signal-to-noise ratio of the first terminal device; and the method further comprises: sending the power coefficient to the first terminal device.

13. The method according to paragraph number 11 above, wherein the determining a power coefficient of the transmit power of the reference signal of the first terminal device comprises: determining the power coefficient based on a pattern of the reference signal.

14. The method according to paragraph number 11 above, wherein the determining a power coefficient of the transmit power of the reference signal of the first terminal device comprises: receiving the power coefficient sent by the first terminal device, wherein the power coefficient is determined based on a pattern of the reference signal and a signal-to-noise ratio of the first terminal device.

15. A terminal device comprising: a determining unit configured to determine transmit power of a reference signal of a first terminal device, wherein the transmit power is related to a quantity of unavailable time-frequency resources in a transmission unit in which the reference signal is located; and a transmit unit configured to transmit the reference signal based on the transmit power.

16. The terminal device according to paragraph number 15 above, wherein the unavailable time-frequency resource is a time-frequency resource occupied by a reference signal of at least one other second terminal device that is scheduled together with the terminal device, and a time-frequency resource occupied by a data channel of the first terminal device at least partially overlaps a time-frequency resource occupied by a data channel of the at least one other second terminal device.

17. The terminal device according to paragraph number 15 above, wherein a larger quantity of unavailable time-frequency resources results in higher transmit power.

18. The terminal device according to paragraph number 15 above, wherein the determining unit is specifically configured to: determine a power coefficient of the transmit power of the reference signal of the first terminal device, wherein the power coefficient is related to the quantity of unavailable time-frequency resources in the transmission unit in which the reference signal is located; and calculate the transmit power of the reference signal of the first terminal device based on the power coefficient, wherein the transmit power is a product of the power coefficient and preset basic power.

19. The terminal device according to paragraph number 18 above, further comprising: a receiving unit, configured to receive the power coefficient sent by a network device, wherein the power coefficient is determined based on a pattern of the reference signal and a signal-to-noise ratio of the first terminal device.

20. The terminal device according to paragraph number 18 above, wherein the determining unit is specifically configured to: determine the power coefficient based on a pattern of the reference signal.

21. The terminal device according to paragraph number 18 above, wherein the determining unit is specifically configured to: determine the power coefficient based on a pattern of the reference signal and a signal-to-noise ratio; and the terminal device further comprises: a sending unit, configured to send the power coefficient to a network device.

22. A network device comprising: a receiving unit configured to receive a reference signal from a first terminal device; a determining unit configured to determine transmit power of the reference signal, wherein the transmit power of the reference signal is related to a quantity of unavailable time-frequency resources in a transmission unit in which the reference signal is located; and a processing unit configured to parse the reference signal based on the transmit power.

23. The network device according to paragraph number 22 above, wherein the unavailable time-frequency resource is a time-frequency resource occupied by a reference signal of at least one other second terminal device that is scheduled together with the first terminal device, and a time-frequency resource occupied by a data channel of the first terminal device at least partially overlaps a time-frequency resource occupied by a data channel of the at least one other second terminal device.

24. The network device according to paragraph number 22 above, wherein a larger quantity of unavailable time-frequency resources results in higher transmit power.

25. The network device according to paragraph number 22 above, wherein the determining unit is specifically configured to: determine a power coefficient of the transmit power of the reference signal of the first terminal device, wherein the power coefficient is related to the quantity of unavailable time-frequency resources in the transmission unit in which the reference signal is located; and calculate the transmit power of the reference signal of the first terminal device based on the power coefficient, wherein the transmit power is a product of the power coefficient and preset basic power.

26. The network device according to paragraph number 25 above, wherein the determining unit is further specifically configured to: determine the power coefficient based on a pattern of the reference signal and a signal-to-noise ratio of the first terminal device; and the network device further comprises: a sending unit, configured to send the power coefficient to the first terminal device.

27. The network device according to paragraph number 25 above, wherein the determining unit is specifically configured to: determine the power coefficient based on a pattern of the reference signal.

28. The network device according to paragraph number 25 above, wherein the network device further comprises: a receiving unit, configured to receive the power coefficient sent by the first terminal device, wherein the power coefficient is determined based on a pattern of the reference signal and a signal-to-noise ratio of the first terminal device.

29. A reference signal sending method comprising: determining transmit power of a reference signal, wherein power of an orthogonal frequency division multiplexing OFDM symbol on which the reference signal is located is the same as power of OFDM on which data is located, and power of a resource element occupied by the reference signal is boosted; and sending the reference signal based on the transmit power.

30. The method according to paragraph number 29 above, wherein before the determining transmit power of a reference signal, the method further comprises: receiving instruction information sent by a network device, wherein the instruction information is used to instruct to boost power of the reference signal.

31. A reference signal receiving method comprising: receiving a reference signal sent by a terminal device; determining transmit power of the reference signal, wherein power of an orthogonal frequency division multiplexing OFDM symbol on which the reference signal is located is the same as power of OFDM on which data is located, and power of a resource element occupied by the reference signal is boosted; and parsing the reference signal based on the transmit power.

32. The method according to paragraph number 31 above, wherein the method further comprises: sending instruction information to the terminal device, wherein the instruction information is used to instruct to boost power of the reference signal.

33. A reference signal sending method, comprising: determining transmit power of a reference signal based on a power coefficient Powerboosting of the transmit power, wherein the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of a terminal device; and sending the reference signal based on the transmit power.

34. A reference signal sending method comprising: receiving a reference signal sent by a terminal device; determining transmit power of the reference signal based on a power coefficient Powerboosting of the transmit power, wherein the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of the terminal device; and parsing the reference signal based on the transmit power.

35. The method according to paragraph number 34 above, wherein the transmit power, the power coefficient, and basic transmit power meet the following relationship: 20*lg (Power coefficient)=10*lg(Transmit power/Basic transmit power).

36. The method according to paragraph number 34 above, wherein the power coefficient is:

$$Powerboosting = \sqrt{\frac{N_{Mute}REs + N_{DMRS} + REs}{N_{DMRS}REs}} \; ; \text{or}$$

$$Powerboosting = \sqrt{\frac{N_{Total}REs - N_{Data}REs}{N_{DMRS}REs}} \; ; \text{or}$$

$$Powerboosting = \sqrt{\frac{CDM_{Cell}}{CDM_{UE}}} \; ; \text{or}$$

$$Powerboosting = \sqrt{CDM_{Cell}},$$

Powerboosting=$\sqrt{CDM_{Cell}}$, wherein $N_{Mute}REs$ is the quantity of unavailable resource elements, $N_{RS}REs$ is the quantity of resource elements occupied by the reference signal, $N_{Total}REs$ is the quantity of resource elements on the OFDM symbol on which the reference signal is located, $N_{Data}REs$ is the quantity of resource elements on the OFDM symbol that are occupied by the data, $CDM_{Cell}$ is the quantity of port groups corresponding to the frequency-division multiplexed reference signal in the cell, and $CDM_{UE}$ is the quantity of port groups corresponding to the frequency-division multiplexed reference signal of the terminal device.

37. A reference signal sending method comprising: receiving a pattern of a reference signal and a port indication of the reference signal that are sent by a network device; determining transmit power of the reference signal based on the pattern of the reference signal and the port indication of the reference signal; and sending the reference signal based on the transmit power.

38. The method according to paragraph number 37 above, wherein the pattern of the reference signal comprises a quantity of orthogonal frequency division multiplexing OFDM symbols occupied by the reference signal and a type of the reference signal.

39. The method according to paragraph number 37 above, wherein the determining transmit power of the reference signal based on the pattern of the reference signal and the port indication of the reference signal comprises: determining one correspondence from a plurality of correspondences based on the pattern of the reference signal, wherein each correspondence comprises a correspondence between at least one port indication of a reference signal and at least one power coefficient of transmit power; determining, in the determined correspondence based on the port indication of the reference signal, a power coefficient corresponding to the received port indication of the reference signal; and determining the transmit power based on the power coefficient.

40. A reference signal receiving method comprising: sending a pattern of a reference signal and a port indication of the reference signal to a terminal device; receiving the reference signal sent by the terminal device; determining transmit power of the reference signal based on the pattern of the reference signal and the port indication of the reference signal; and parsing the reference signal based on the transmit power.

41. A communications apparatus comprising: a processing unit configured to determine transmit power of a reference signal, wherein power of an orthogonal frequency division multiplexing OFDM symbol on which the reference signal is located is the same as power of OFDM on which data is located, and power of a resource element occupied by the reference signal is boosted; and a sending unit, configured to send the reference signal based on the transmit power.

42. The communications apparatus according to paragraph number 41 above, further comprising: a receiving unit configured to receive instruction information sent by a network device, wherein the instruction information is used to instruct to boost power of the reference signal.

43. A communications apparatus comprising: a receiving unit configured to receive a reference signal sent by a terminal device; and a processing unit configured to determine transmit power of the reference signal, wherein power of an orthogonal frequency division multiplexing OFDM symbol on which the reference signal is located is the same as power of OFDM on which data is located, and power of a resource element occupied by the reference signal is boosted, wherein the processing unit is further configured to parse the reference signal based on the transmit power.

44. The communications apparatus according to paragraph number 43 above, further comprising: a sending unit configured to send instruction information to the terminal device, wherein the instruction information is used to instruct to boost power of the reference signal.

45. A communications apparatus comprising: a processing unit configured to determine transmit power of a reference signal based on a power coefficient Powerboosting of the transmit power, wherein the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of a terminal device; and a sending unit, configured to send the reference signal based on the transmit power.

46. A communications apparatus comprising: receiving a reference signal sent by a terminal device; determining transmit power of the reference signal based on a power coefficient Powerboosting of the transmit power, wherein the power coefficient is related to at least one of the following parameters: a quantity of unavailable resource elements, a quantity of resource elements occupied by the reference signal, a quantity of resource elements on an orthogonal frequency division multiplexing OFDM symbol on which the reference signal is located, a quantity of resource elements on the OFDM symbol that are occupied by data, a quantity of port groups corresponding to a frequency-division multiplexed reference signal in a cell, and a quantity of port groups corresponding to a frequency-division multiplexed reference signal of the terminal device; and parsing the reference signal based on the transmit power.

47. The communications apparatus according to paragraph number 46 above, wherein the transmit power, the power coefficient, and basic transmit power meet the following relationship:

$$20*\lg(\text{Power coefficient})=10*\lg(\text{Transmit power/Basic transmit power}).$$

48. The communications apparatus according to paragraph number 46 above, wherein the power coefficient is:

$$Powerboosting = \sqrt{\frac{N_{Mute}REs + N_{DMRS} + REs}{N_{DMRS}REs}}\text{; or}$$

$$Powerboosting = \sqrt{\frac{N_{Total}REs - N_{Data}REs}{N_{DMRS}REs}}\text{; or}$$

$$Powerboosting = \sqrt{\frac{CDM_{Cell}}{CDM_{UE}}}\text{; or}$$

$$Powerboosting = \sqrt{CDM_{Cell}},$$

Powerboosting=$\sqrt{CDM_{Cell}}$, wherein $N_{Mute}REs$ is the quantity of unavailable resource elements, $N_{RS}REs$ is the quantity of resource elements occupied by the reference signal, $N_{Total}REs$ is the quantity of resource elements on the OFDM symbol on which the reference signal is located, $N_{Data}REs$ is the quantity of resource elements on the OFDM symbol that are occupied by the data, $CDM_{Cell}$ is the quantity of port groups corresponding to the frequency-division multiplexed reference signal in the cell, and $CDM_{UE}$ is the quantity of port groups corresponding to the frequency-division multiplexed reference signal of the terminal device.

49. A communications apparatus comprising: a receiving unit configured to receive a pattern of a reference signal and a port indication of the reference signal that are sent by a network device; a processing unit configured to determine transmit power of the reference signal based on the pattern of the reference signal and the port indication of the reference signal; and a sending unit, configured to send the reference signal based on the transmit power.

50. The communications apparatus according to paragraph number 49 above, wherein the pattern of the reference signal comprises a quantity of orthogonal frequency division multiplexing OFDM symbols occupied by the reference signal and a type of the reference signal.

51. The communications apparatus according to paragraph number 49 above, wherein the processing unit is specifically configured to: determine one correspondence from a plurality of correspondences based on the pattern of the reference signal, wherein each correspondence comprises a correspondence between at least one port indication of a reference signal and at least one power coefficient of transmit power; determine, in the determined correspondence based on the port indication of the reference signal, a power coefficient corresponding to the received port indication of the reference signal; and determine the transmit power based on the power coefficient.

52. A communications apparatus comprising: a sending unit configured to send a pattern of a reference signal and a port indication of the reference signal to a terminal device; a receiving unit configured to receive the reference signal sent by the terminal device; and a processing unit configured to determine transmit power of the reference signal based on the pattern of the reference signal and the port indication of the reference signal, wherein the processing unit is further configured to parse the reference signal based on the transmit power.

What is claimed is:
1. A reference signal sending method comprising:
determining, by a first terminal device, a power coefficient of transmit power of a reference signal of the first terminal device based on at least a pattern of the reference signal,
wherein the power coefficient is related to a quantity of unavailable time-frequency resources in a transmission unit in which the reference signal is located, and
wherein the transmit power is a product of the power coefficient and preset basic power;

determining, by the first terminal device, the transmit power of the reference signal of the first terminal device based on the power coefficient; and transmitting, by the first terminal device, the reference signal based on the transmit power.

2. The method according to claim 1, wherein the unavailable time-frequency resource is a time-frequency resource occupied by a reference signal of at least one second terminal device that is scheduled together with the first terminal device, and a time-frequency resource occupied by a data channel of the first terminal device at least partially overlaps a time-frequency resource occupied by a data channel of the at least second terminal device.

3. The method according to claim 1, wherein a larger quantity of unavailable time-frequency resources results in higher transmit power.

4. The method according to claim 1, wherein determining the power coefficient of the transmit power of the reference signal of the first terminal device comprises:

receiving, by the first terminal device, the power coefficient sent by a network device, wherein the power coefficient is determined based on the pattern of the reference signal and a signal-to-noise ratio of the first terminal device.

5. The method according to claim 1, wherein determining the power coefficient of the transmit power of the reference signal of the first terminal device based on at least the pattern of the reference signal comprises:

determining the power coefficient based on the pattern of the reference signal and a signal-to-noise ratio; and the method further comprises:

sending, by the first terminal device, the power coefficient to a network device.

6. A reference signal receiving method comprising:

receiving, by a network device, a reference signal from a first terminal device;

determining, by the network device, a power coefficient of transmit power of the reference signal of the first terminal device based on at least a pattern of the reference signal, wherein the power coefficient of the reference signal is related to a quantity of unavailable time-frequency resources in a transmission unit in which the reference signal is located, and wherein the transmit power is a product of the power coefficient and preset basic power determining, by the network device, the transmit power of the reference signal of the first terminal device based on the power coefficient; and parsing, by the network device, the reference signal based on the transmit power.

7. The method according to claim 6, wherein the unavailable time-frequency resource is a time-frequency resource occupied by a reference signal of at least a second terminal device that is scheduled together with the first terminal device, and a time-frequency resource occupied by a data channel of the first terminal device at least partially overlaps a time-frequency resource occupied by a data channel of the at least second terminal device.

8. The method according to claim 6, wherein a larger quantity of unavailable time-frequency resources results in higher transmit power.

9. The method according to claim 6, wherein determining the power coefficient of the transmit power of the reference signal of the first terminal device based on at least the pattern of the reference signal comprises:

determining, by the network device, the power coefficient based on the pattern of the reference signal and a signal-to-noise ratio of the first terminal device; and the method further comprises:

sending, by the network device, the power coefficient to the first terminal device.

10. The method according to claim 6, wherein determining power coefficient of the transmit power of the reference signal of the first terminal device based on at least the pattern of the reference signal comprises:

receiving, by the network device, the power coefficient sent by the first terminal device, wherein the power coefficient is determined based on the pattern of the reference signal and a signal-to-noise ratio of the first terminal device.

11. A first terminal device comprising:

a processor and a computer-readable medium storing computer-executable instructions that, when executed by the processor, cause the processor to be configured to provide at least the following operations:

determine a power coefficient of a reference signal of the first terminal device based on at least a pattern of the reference signal, wherein the transmit power is related to a quantity of unavailable time-frequency resources in a transmission unit in which the reference signal is located; and determine the transmit power of the reference signal based on the power coefficient, wherein the transmit power is a product of the power coefficient and preset basic power; and a transmitter configured to cooperate with the processor to transmit the reference signal based on the transmit power.

12. The first terminal device according to claim 11, wherein the unavailable time-frequency resource is a time-frequency resource occupied by a reference signal of at least a second terminal device that is scheduled together with the first terminal device, and a time-frequency resource occupied by a data channel of the first terminal device at least partially overlaps a time-frequency resource occupied by a data channel of the at least second terminal device.

13. The first terminal device according to claim 11, wherein a larger quantity of unavailable time-frequency resources results in higher transmit power.

14. The first terminal device according to claim 11, further comprising:

a receiver configured to cooperate with the processor to receive the power coefficient sent by a network device, wherein the power coefficient is determined based on the pattern of the reference signal and a signal-to-noise ratio of the first terminal device.

15. The first terminal device according to claim 11, wherein the processor is further configured to determine the power coefficient based on the pattern of the reference signal and a signal-to-noise ratio; and the receiver is further configured to cooperate with the processor to send the power coefficient to a network device.

* * * * *